(12) United States Patent
Johnsen et al.

(10) Patent No.: US 11,178,457 B2
(45) Date of Patent: Nov. 16, 2021

(54) INTERACTIVE MUSIC CREATION AND PLAYBACK METHOD AND SYSTEM

(71) Applicant: Per Gisle Johnsen, Bergen (NO)

(72) Inventors: Per Gisle Johnsen, Bergen (NO); Yrjan Tangenes, Trondheim (NO)

(73) Assignee: Per Gisle Johnsen, Bergen (NO)

( * ) Notice: Subject to any disclaimer, the term of this patent is extended or adjusted under 35 U.S.C. 154(b) by 0 days.

(21) Appl. No.: 16/325,487

(22) PCT Filed: Aug. 15, 2017

(86) PCT No.: PCT/US2017/046931
§ 371 (c)(1),
(2) Date: Feb. 14, 2019

(87) PCT Pub. No.: WO2018/035117
PCT Pub. Date: Feb. 22, 2018

(65) Prior Publication Data
US 2019/0182552 A1    Jun. 13, 2019

Related U.S. Application Data

(60) Provisional application No. 62/377,007, filed on Aug. 19, 2016.

(51) Int. Cl.
*H04N 21/439* (2011.01)
*H04N 21/472* (2011.01)
(Continued)

(52) U.S. Cl.
CPC ..... *H04N 21/47205* (2013.01); *G06F 3/0482* (2013.01); *G06F 3/04845* (2013.01);
(Continued)

(58) Field of Classification Search
CPC ... H04N 21/2552; H04N 21/40; H04N 21/452
See application file for complete search history.

(56) References Cited

U.S. PATENT DOCUMENTS 8,340,324 B2 * 12/2012 Terada ................... G11B 27/34
                                                                  381/119
9,146,674 B2 *  9/2015 Karlsson ............. G06F 3/04883
(Continued)

FOREIGN PATENT DOCUMENTS

WO        03/017082 A1    2/2003

OTHER PUBLICATIONS

ISA/US, PCT International Search Report and Written Opinion of ISA dated Dec. 5, 2017 issued in PCT International Application No. PCT/US2017/046931 filed Aug. 15, 2017.

*Primary Examiner* — Mushfikh I Alam
(74) *Attorney, Agent, or Firm* — Gottlieb, Rackman & Reisman, PC

(57) ABSTRACT

A system and method for music delivery and customization includes a concept and approach to music recording, storage, customization, and delivery, in a manner such that subsequent listeners can individually supplement and/or adjust music content for later playback or other uses. Music can be arranged by merging any number of recorded tracks with live music and rerecorded or remixed, where control can be achieved in real time and in the further presence of video.

14 Claims, 27 Drawing Sheets

(51) Int. Cl.
  *G11B 27/038* (2006.01)
  *G06F 3/0482* (2013.01)
  *G06F 3/0484* (2013.01)
  *G06F 3/0488* (2013.01)
  *H04N 21/422* (2011.01)
  *H04N 21/8547* (2011.01)
(52) U.S. Cl.
  CPC ........ *G06F 3/04883* (2013.01); *G11B 27/038* (2013.01); *H04N 21/42224* (2013.01); *H04N 21/439* (2013.01); *H04N 21/8547* (2013.01)

(56) References Cited

U.S. PATENT DOCUMENTS

| | | | | |
|---|---|---|---|---|
| 9,305,601 | B1* | 4/2016 | Itelman | H04N 9/87 |
| 2003/0041159 | A1* | 2/2003 | Tinsley | G06F 9/451 |
| | | | | 709/231 |
| 2005/0157830 | A1* | 7/2005 | Ota | H04H 60/04 |
| | | | | 375/377 |
| 2006/0232586 | A1* | 10/2006 | Terada | G06T 11/206 |
| | | | | 345/440 |
| 2007/0211023 | A1* | 9/2007 | Boillot | G06F 3/0346 |
| | | | | 345/156 |
| 2011/0064248 | A1* | 3/2011 | Suyama | H04H 60/04 |
| | | | | 381/119 |
| 2011/0203442 | A1* | 8/2011 | Raveendran | G10G 1/00 |
| | | | | 84/483.1 |
| 2012/0192119 | A1* | 7/2012 | Zaliva | G06F 3/04883 |
| | | | | 715/863 |
| 2012/0297958 | A1* | 11/2012 | Rassool | G10H 1/0025 |
| | | | | 84/609 |
| 2014/0215336 | A1* | 7/2014 | Gardenfors | G06F 3/017 |
| | | | | 715/719 |
| 2014/0223307 | A1* | 8/2014 | McIntosh | G06F 3/0484 |
| | | | | 715/719 |
| 2015/0256957 | A1* | 9/2015 | Kim | H04R 3/12 |
| | | | | 381/303 |
| 2016/0017393 | A1 | 1/2016 | Jacobson et al. | |
| 2016/0173931 | A1* | 6/2016 | Eber | H04N 21/4341 |
| | | | | 725/38 |
| 2016/0350064 | A1* | 12/2016 | Miwa | G06F 3/162 |
| 2018/0267772 | A1* | 9/2018 | Lee | G06F 3/165 |

* cited by examiner

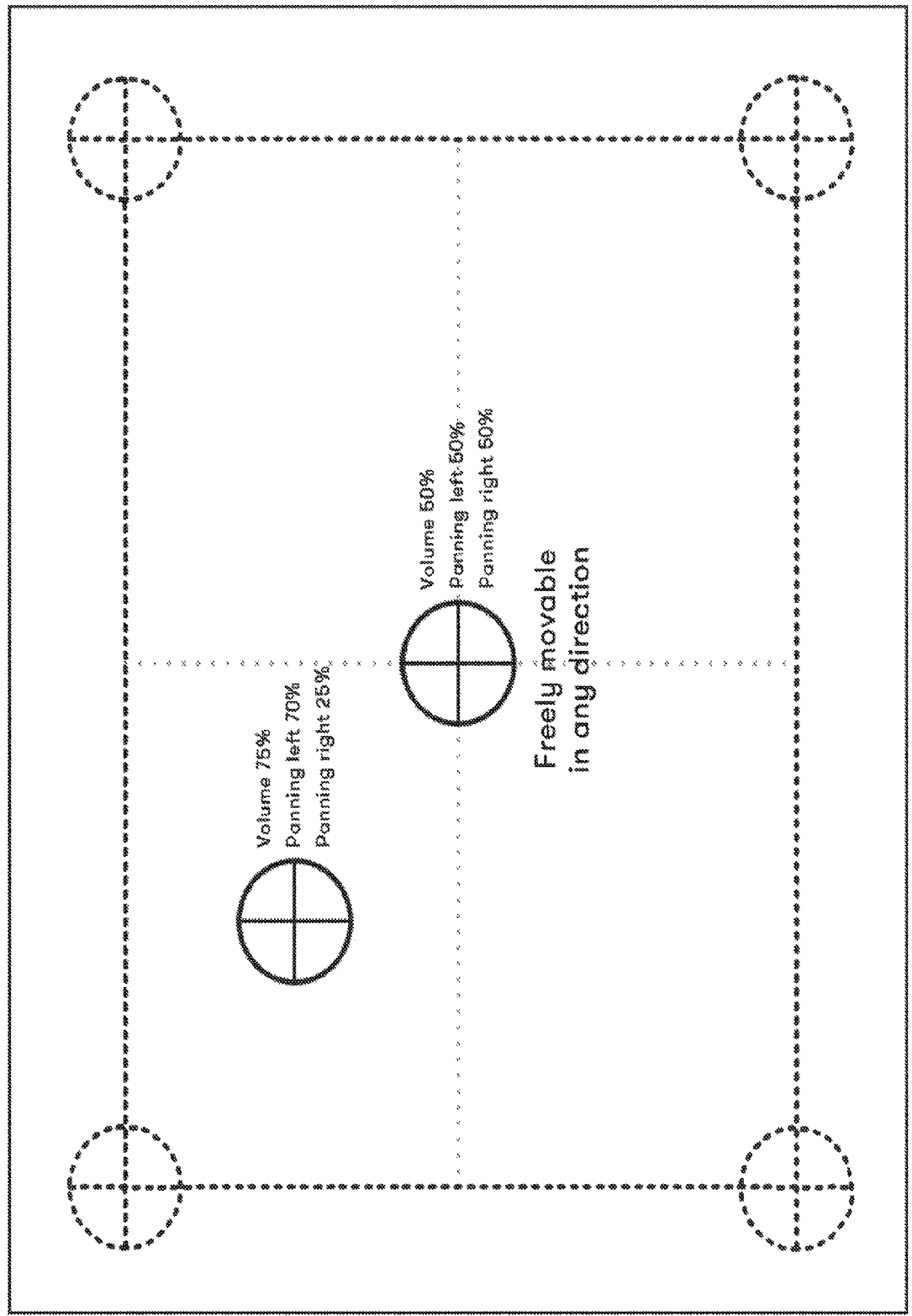

App screenshot

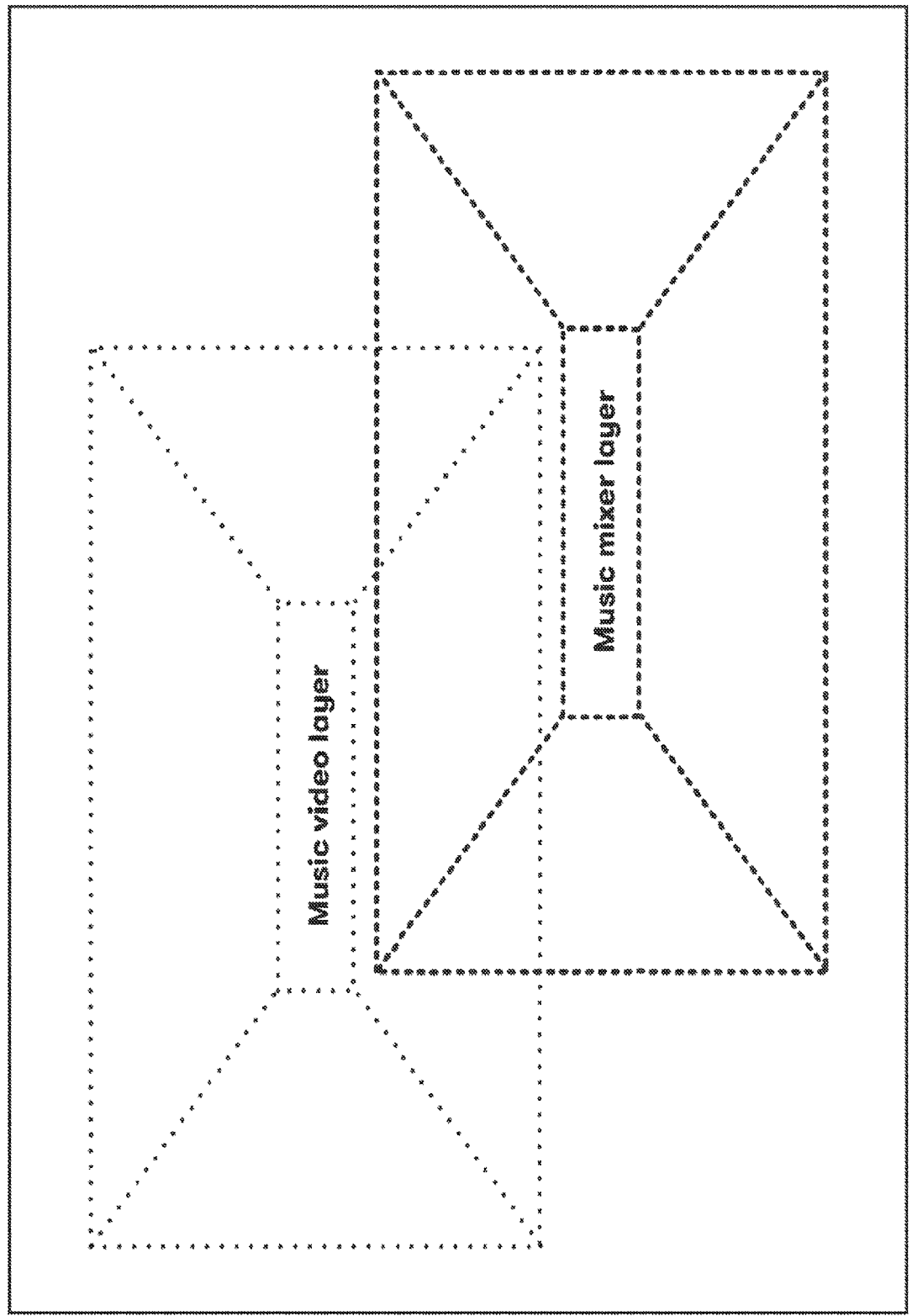
FIG. 2a Main interface (maximum volume on top)

App screenshot

INTERACTIVE MUSIC CREATION AND PLAYBACK METHOD AND SYSTEM

CROSS-REFERENCE TO RELATED APPLICATIONS

This is a U.S. national phase application, filed under 35 U.S.C. § 371 of International Patent Application No. PCT/US2017/046931, filed on Aug. 15, 2017, and claims benefit of priority to U.S. Provisional Patent Application No. 62/377,007, filed on Aug. 19, 2016. The entire contents of these applications are incorporated herein by reference.

BACKGROUND OF THE PRESENT INVENTION

The definition of music differs depending on who you ask and where you are situated. Is music defined by a live performance, experienced in a specific time and space? Or is it a recorded object, static in its existence, allowing listeners to control how it is listened to? Or is it defined by its written form, a published piece of work? Other forms could also define music—be they on vinyl or streamed, a music video, simply the lyrics/words, the chords, an instructional video synchronized with the audio file or a software allowing you to interact with the recorded music in real time—the form in which music is expressed/emitted/shared is today multiple.

So we can define music within the context of ever-changing technological developments, which seem to redefine music at every turn.

Today, one can buy music in each of the above-described forms separately. One can purchase a piece of music on vinyl, on tape, on a digital recording, on sheet music, or listen to it streamed. In any of these, music may be fixed within a medium and unchangeable. As a recorded item, the recording is ordinarily available as a single recording, but may be tracked such as for stereo delivery. Each of these recorded items defines a piece of music in some way. But there may be alternative definitions to music—something akin to a series of interconnected elements, at least some of which are selected and potentially expanded by introduction of other materials so as to create an advanced version of a defined piece of music.

But we would like to ask—what if a piece of music is no longer simply just something that manifests itself as a stream, an audio file, a note or the lyrics? Instead, music can be defined in a different way—as something foundational yet expandable, and also customizable by individuals.

Today, through various options such as those found in the digital game sphere, even young children have the ability to interact with music through a digital device, such as by controlling playback. But traditionally, in films, videos, or recorded music, it was the producer who predestined what to watch or listen to.

Occasionally, it is possible to find and download a multi-track version of a piece of music and mix this through a mixing console. But when music is playing along with a movie or a music video (music as an integrated part of the video), it is currently impossible to edit the audio in sync with the film/video while watching it.

SUMMARY OF THE PRESENT INVENTION

The present invention is directed to a system and method for music delivery and customization, referred to herein as "OIID", which includes a literal or figurative folder of files for one "OIID" song, with the files collectively referred to herein as "OIID music". More generally, the present invention is directed to a concept and approach to music recording, storage, customization, and delivery, in a manner such that subsequent listeners can individually supplement and/or adjust music content for later playback or other uses.

The present invention is further directed to a system and method for music recording, storage, customization, and delivery, whereby music can be arranged by merging any number of recorded tracks with live music and rerecorded or remixed, where control can be achieved in real time and in the further presence of video. The present invention is further directed to a recording and storage structure for music as well. In the context of the present invention, listeners of recorded tracks have the potential for customizing music, such as by selecting among recorded tracks and supplementing those tracks with additional tracks, such as ones performed concurrently while listening to the recorded tracks (a la karaoke), further supplemented by the ability to form a music video from potentially a plurality of selections, and doing so while concurrently controlling attributes such as but not limited to balance and volume. This control feature itself is novel and customizable.

The present invention is also directed to a processor-based application for formatting and storing music and video in a proprietary or potentially non-proprietary format, in which music is in multitrack format and can be synchronized with the video. We add a virtual interactive mixing console within the application. In this way, users are able to create their own mix in real time while one or more video runs and the music plays. The videos can be synchronized to the sound.

The present invention is further directed to a new form of music or recording whereby a user can interact with multiple selectable tracks. Consequently, the present invention is further directed to a method for recording and storing music so as to allow for such subsequent selection and reuse.

"Music" in the present invention is comprised of combinations of sheet music, chords, lyrics, commentary, and video, together with the ability to control the sound, speed, volume and panning of the sound, and combined with the potential ability to select and control video, all within one single finger motion on a touch screen.

An analogy is shown in FIG. 1 below, depicting an atom with a nucleus. One can think of today's music as the nucleus with surrounding portions including dynamic/interactive capabilities. These capabilities allow for expansion into far more than recorded music.

In summary, OIID is a platform and service in which recorded video and/or audio content is pre-structured in a defined manner, such as at the time of recording, so that the content can be played back in various combinations, new tracks can be added, and a user can control attributes of play back and recording in real time with a graphical user interface affording one finger control. The system of the present invention, which preferably is generally housed in a single portable device, includes:

A controller/processor configured for preparation, control, arrangement, and playback of audio and video files.

A storage medium for storage of files.

An app or other user-based means for selection, recording, and play back of audio and video.

A mixer for mixing different tracks.

A custom graphical user interface (GUI), preferably accessible through an app, for mixing music, whereby a user can select multiple tracks for concurrent playback and can control them individually or collectively.

A user controllable display, preferably controllable through the GUI, for a visual display of content associated with audio during playback and for controlling recording, where the GUI may reside on a personal computing device such as a personal computer, smart phone, or tablet.

The display is controllable for track selection and to control parameters of playback, such as volume and panning, among other potential purposes.

Control is preferably single finger control.

Communications means, such as to direct playback to an alternate device.

A means for recording over and above selected tracks.

Means for creating music from different tracks.

Means for merging audio and video (multi-media mixing) into a new musical event which may be recorded.

Means for separating content from tracks and converting the separated content into related tracks for concurrent playback and matching.

A synchronization means for synchronizing play back of a plurality of tracks.

A storage means whereby a new combination of audio/visual tracks can be stored with the express intent of later selection of different combinations of track for play back in synchrony and played back on demand.

BRIEF DESCRIPTION OF THE FIGURES

FIG. 1a depicts a sample graphical user interface of the present invention for controlling music tracks.

FIG. 2a depicts an overlay view of the graphical user interface of the present invention, showing two separate controllable screens concurrently visible.

DETAILED DESCRIPTION OF THE PRESENT INVENTION

Figure 1:
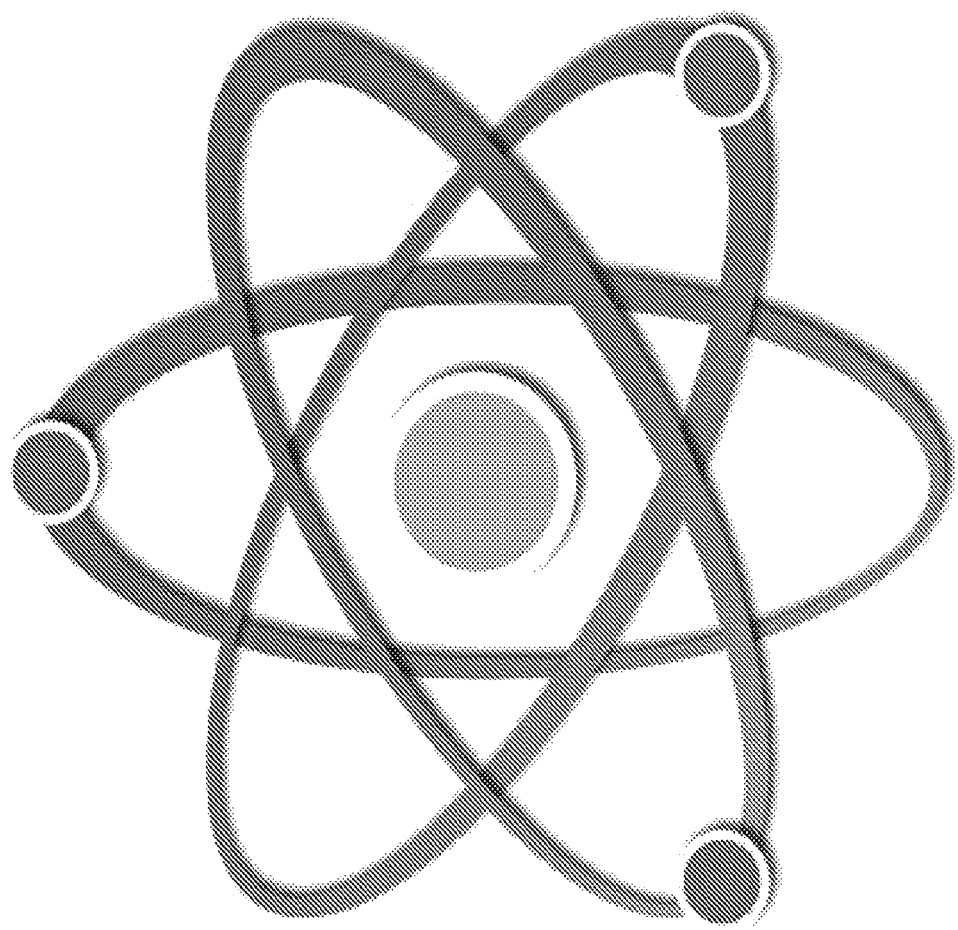
FIG. 1 depicts an analogy of the present invention by way of a body with orbiting bodies.

In general, OIID affords a new and inventive means of creating and publishing music. At a basic level, an OIID "song" is comprised of at least a literal, electronic, and/or figurative digital folder of at least one digital file, including potentially at least one file of digitally encoded sheet music and corresponding recorded tracks, potentially including video tracks.

The present invention comprises a processor programmed to (1) recognize a plurality of component entries, each available in a data store, each in the form of a digital file, each potentially time synchronized to each other, and each file associated with video, audio, and/or content in another form, (2) synchronize playback of sound and video tracks, (3) record companion tracks and maintain overall synchronization, and (4) concurrently display one or more video tracks, such as but not limited to sheet music and lyrics, either from stored filed or calculated in synchrony with audio files. The playback timing of these files is synchronized such that, for example, the sheet music can appear on a screen with a pointer such that the pointer moves correspondingly to music from one or more of the recorded tracks being played back. In one embodiment at this basic level, OIID can allow a user to play back one or more tracks (together) in conjunction with seeing the corresponding sheet music appearing on a display. Similarly, lyrics can be displayed, in conjunction with or instead of sheet music. The user has real time or near real time, one finger control to control which tracks are played back and how, such as by controlling balance, speed, and volume. In addition, different sheet music can be selected so as to, for example, show different versions of the sheet music as the music (e.g., for different instruments) is being played back.

The net effect is that OIID affords the opportunity to a user to create different combinations of sound and synchronized video, using previously recorded tracks, newly recorded tracks, and formulated tracks, where tracks are formulated by decoding existing tracks. Even after a revised piece is created, another user can control different tracks to afford different playback and/or different experiences.

There are numerous benefits to the present invention. In one example, the invention is usable as an education tool. Students can "play along" and learn a part of a song. For example, the sheet music for a piano part can appear in conjunction with playing the tracks of guitar, bass, and percussion, so that a piano player can learn the piano part of a song. In summary, music can be recorded in tracks, tracks do not need to be recorded concurrently, video can be included in one or more additional tracks, recording can be made through a custom graphical user interface which allows for control of attributes of tracks, and tracks are separable for playback and further encoding.

From one perspective, an OIID song is made up of a folder of files, which can be added to by users, and from which the user can select files for concurrent playback. Files can be added to the folder, such as files of amended sheet music and personal recordings. A "song" is comprised of a series of layered or layerable files. The files include combinations of:

1. Several synchronized graphical image and/or video layers. A user can decide which layer or layers are to be shown on a screen. Layers can be any of the official music video, the sheet music, the lyrics, the chords, animations of how to play each of the instruments, or individual videos of each musician performing the song, or a combination. When a plurality of videos is displayed, the videos may appear synchronized with one another, such as when the song progressively is played. These videos can be played back concurrently, such as the music video with an overlay of the lyrics.

2. Stems of recorded music. In the present invention, a stem is defined as one of several different tracks, or files, of audio (or video) for the song. For example, there might be one track or stem for violins, one for sopranos, one for guitar, one for backup singers, one for each backup singer, and so on, or alternatively, a stem might be the recorded track for a particular singer or instrument. All the stems in the recorded music are also time synchronized with graphical or video elements described above for concurrent playback. The recorded music is made available on a multi-track format for selection by users. That is, the user can also decide what audio track to be played and, if both audio and video are selected, they can be synchronized together so that all selected video and audio playback matches. This could be playing only one of the instruments, a special collection of all the instruments in the song or adjusting/mixing all the instruments in real time when watching the music video/setting up a personal mix in real time when watching the video. There can also be other audio tracks, such as an audio track where the composer or the conductor tells about the song as the song goes along. A user can select combinations to play back. A processor is used to synchronize the files during playback and a user has the ability to record additional tracks to be synchronizable with other saved or stored files.

Controller Functionality

A core attribute of the present invention is a custom graphical controller which allows for selection of tracks for play back and/or recording and single touch adjustment of levels. A processor is a core element of the present invention, where the processor processing controlling functions. A user can execute controlling functions using an app with a GUI or a GUI directly.

FIG. 1a depicts a sample interface for the OIID Controller. In the sample, taken from what might be the screen interface on a touch screen, select buttons appear. These buttons afford single control for volume and panning, although other functions may be controlled this way as well or in the alternative. In the example of FIG. 1a, volume increases upwardly and panning increases to the right.

Figure 1B:
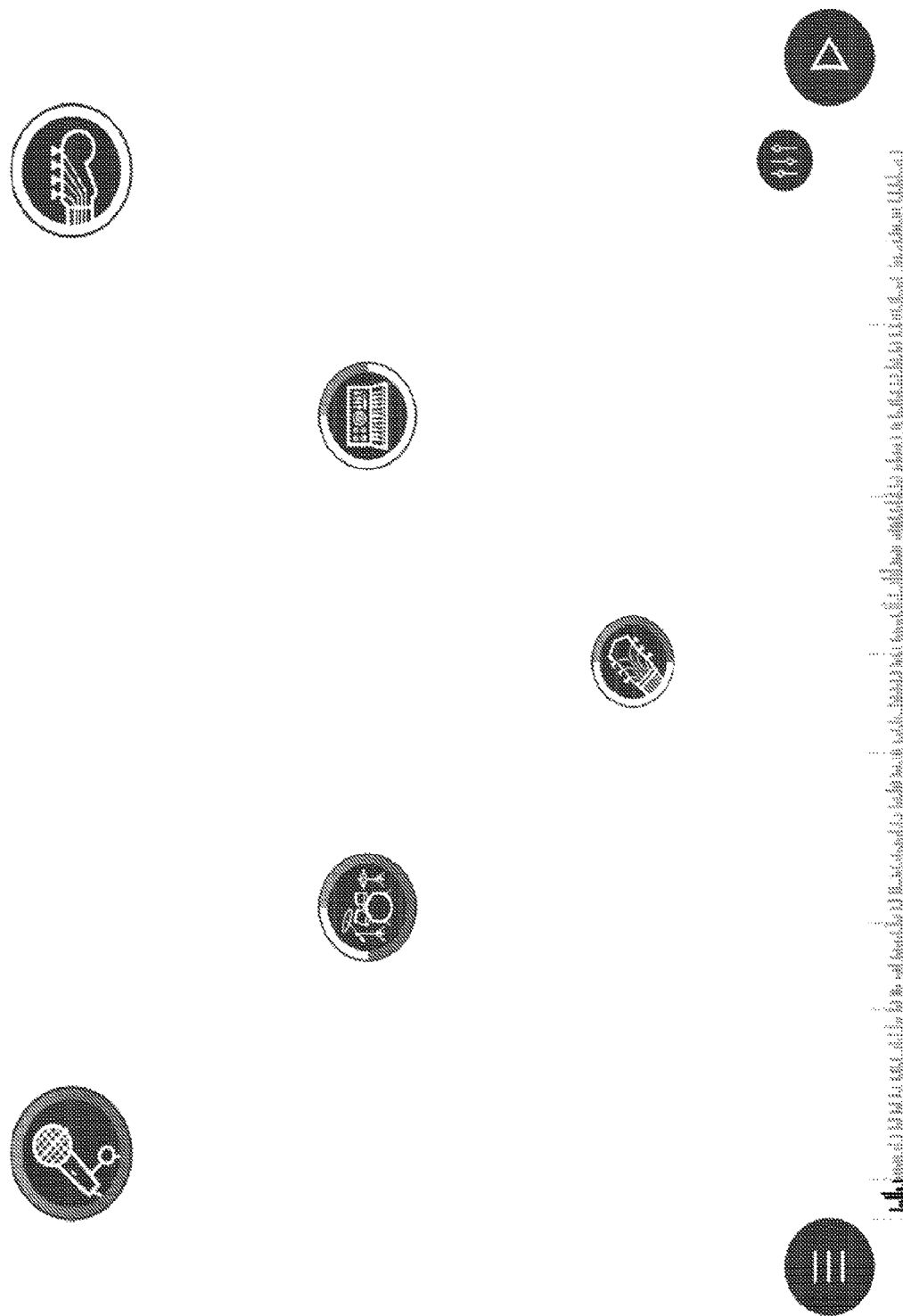
FIG. 1b depicts a sample graphical user interface screenshot, inclusive of a plurality of video tracks.

FIG. 1b shows a further depiction on a screen of the controller in the presence of other functions. As seen on FIG. 1b, a background can be added, here showing a conductor in live action as an example. The bottom of the screen shows introduction of a second video feed showing, for example, the current portion of the over music presently being played. In the main portion of the screen are several controls with icons for different instruments. If, for example, the "drum" button is touched, a user can select increase or decrease of volume or panning of just the drum.

Figure 2B:
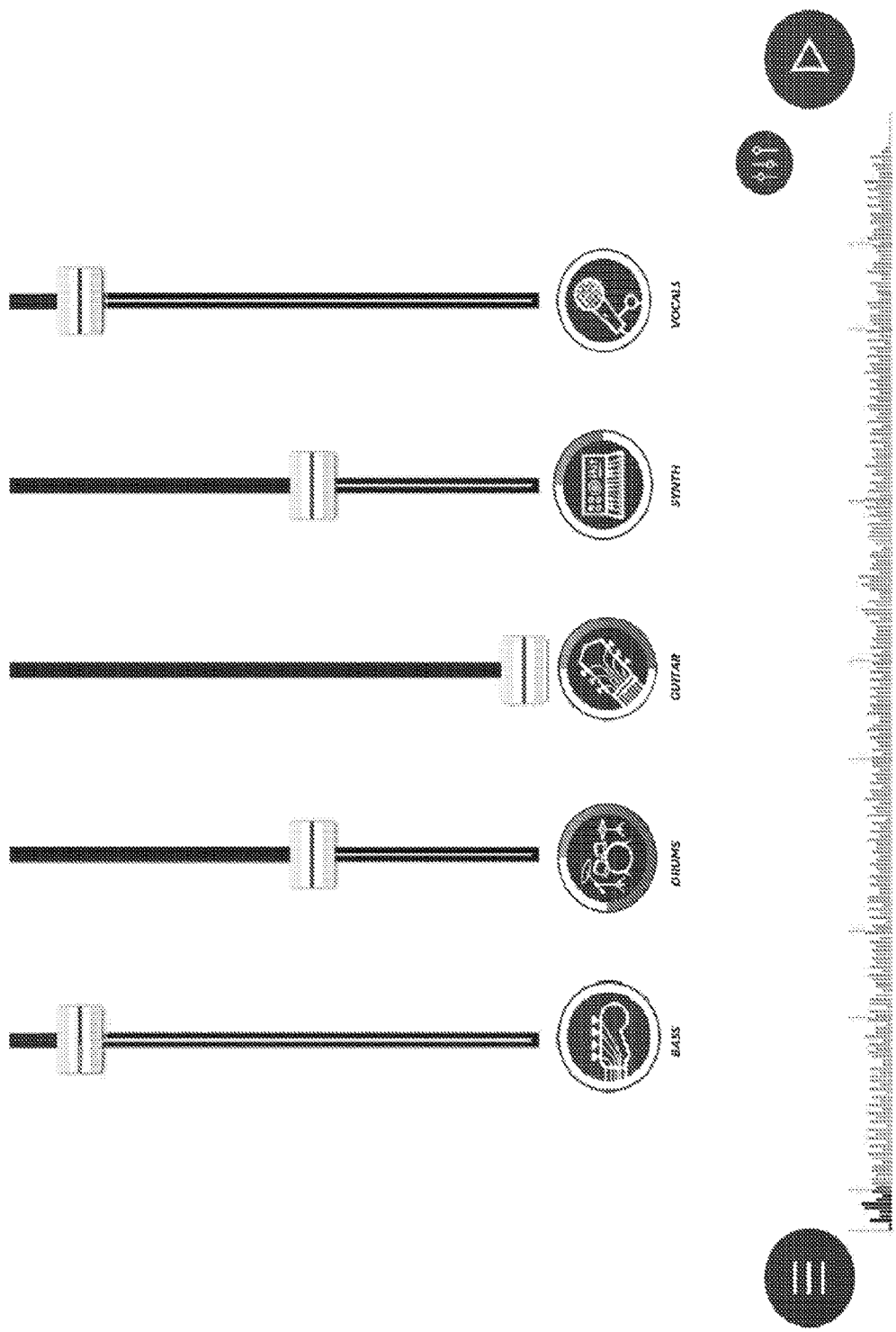
FIG. 2b depicts a variation of the graphical user interface display of FIG. 2A, in which multiple videos are superimposed behind a plurality of controllers.

FIG. 2b shows an alternate display where, for example, only volume control can appear on the screen for control (no panning).

Figure 3:
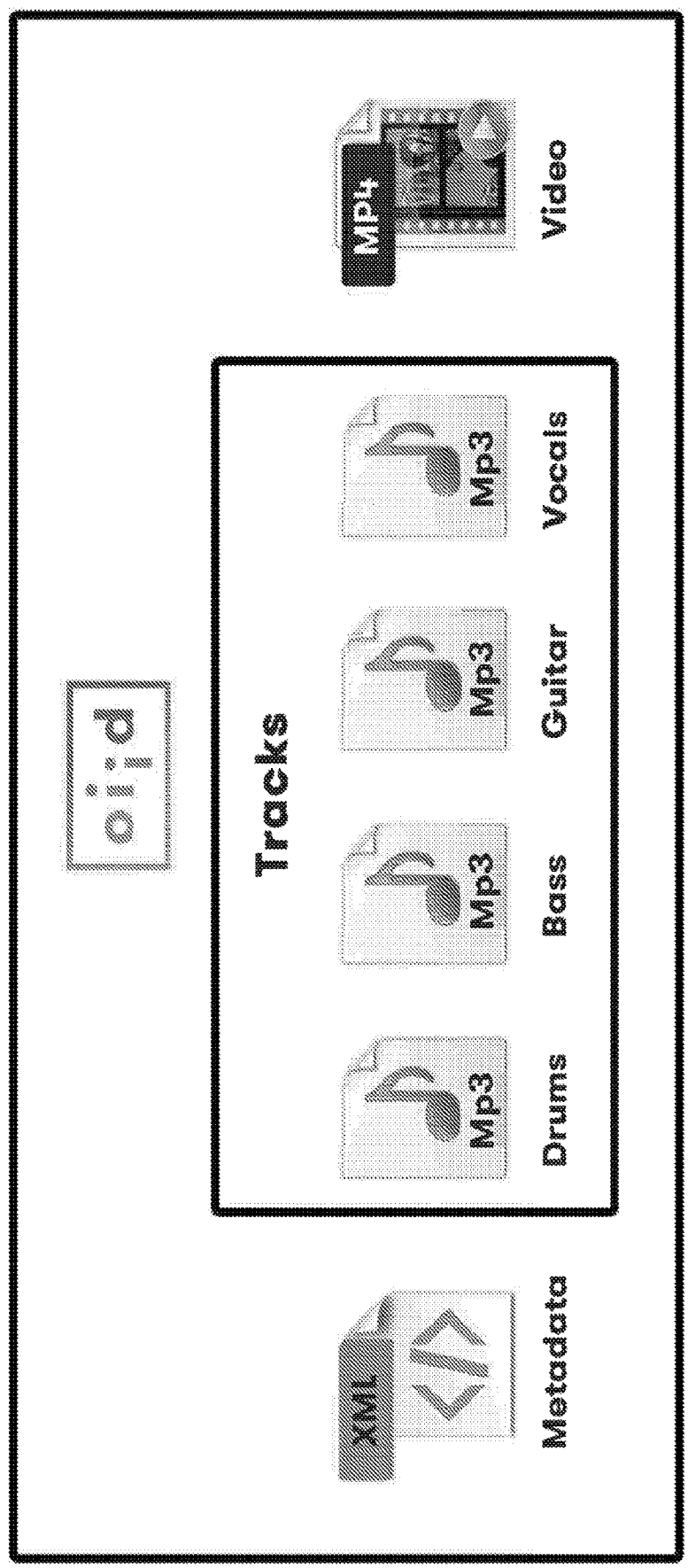
FIG. 3 depicts an example of selectable tracks in the graphical user interface of the present invention in which a user can select instrumentals, vocals, video, or other (such as metadata associated with playback or other metadata).

FIG. 3 depicts an example of selectable tracks in the graphical user interface of the present invention in which a user can select instrumentals, vocals, video, or other (such as metadata associated with playback or other metadata).

As is evident from these figures, the controller of the present invention allows for graphical selection of tracks as well as levels for playback. Also, as is evident, the controller can be used to control both audio and video and can be used as input to mixing selected tracks, including tracks being recorded.

Mixing

In the audio world, a mixing console is an electronic device for combining and changing volume levels, the panning, timbre (tone color) and/or dynamics of many different audio signals. Mixing consoles are used in many applications, including recording studios, broadcasting, television and film post-production. A typical, simple application combines signals from several microphones into an amplifier that drives one set of speakers simultaneously. In live performances, the signal from the mixer usually goes directly to an amplifier, which is plugged into speaker cabinets. Mixing consoles are still using the same interface as they did years ago. Even if the sound production has gone digital, a digital mixing console still has one fader for adjusting the volume and another button for adjusting the panning.

Figure 5:
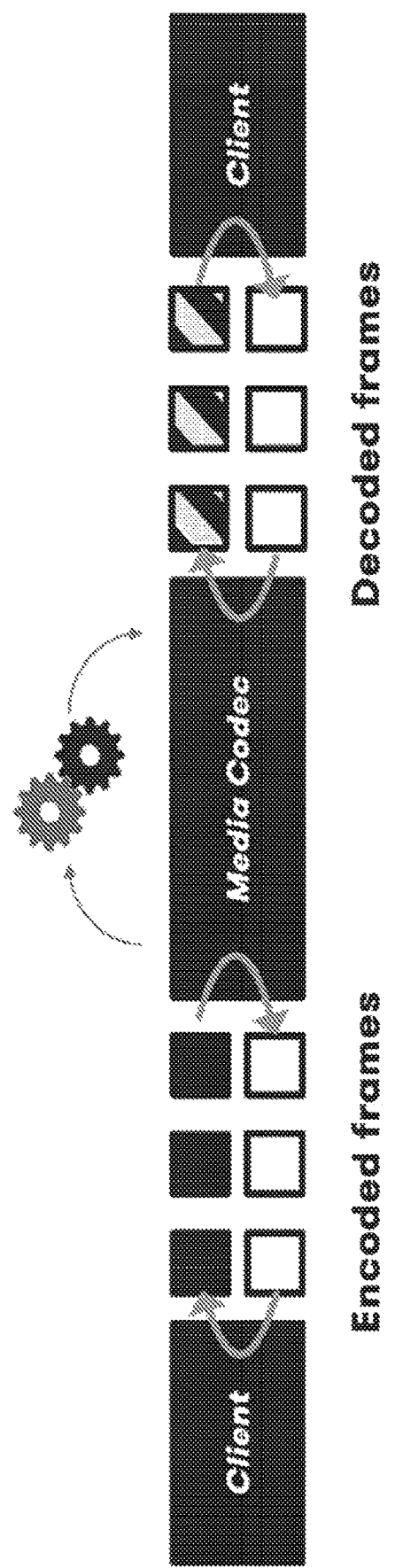
FIG. 5 depicts a graphical representation of the mixing of the present invention in which a media codec is used to decode and encode frames.

The present invention includes a processor programmed to provide the mixing function but finger-touch controlled by a 2-dimensional audio mixing console in an overlaid GUI, where a user has only one virtual button control for adjusting both adjusting volume and panning, meaning you only use one finger for adjusting both volume and panning concurrently. FIG. 5 depicts a graphical representation of the mixing of the present invention in which a media codec is used to decode and encode frames.

Figure 8:
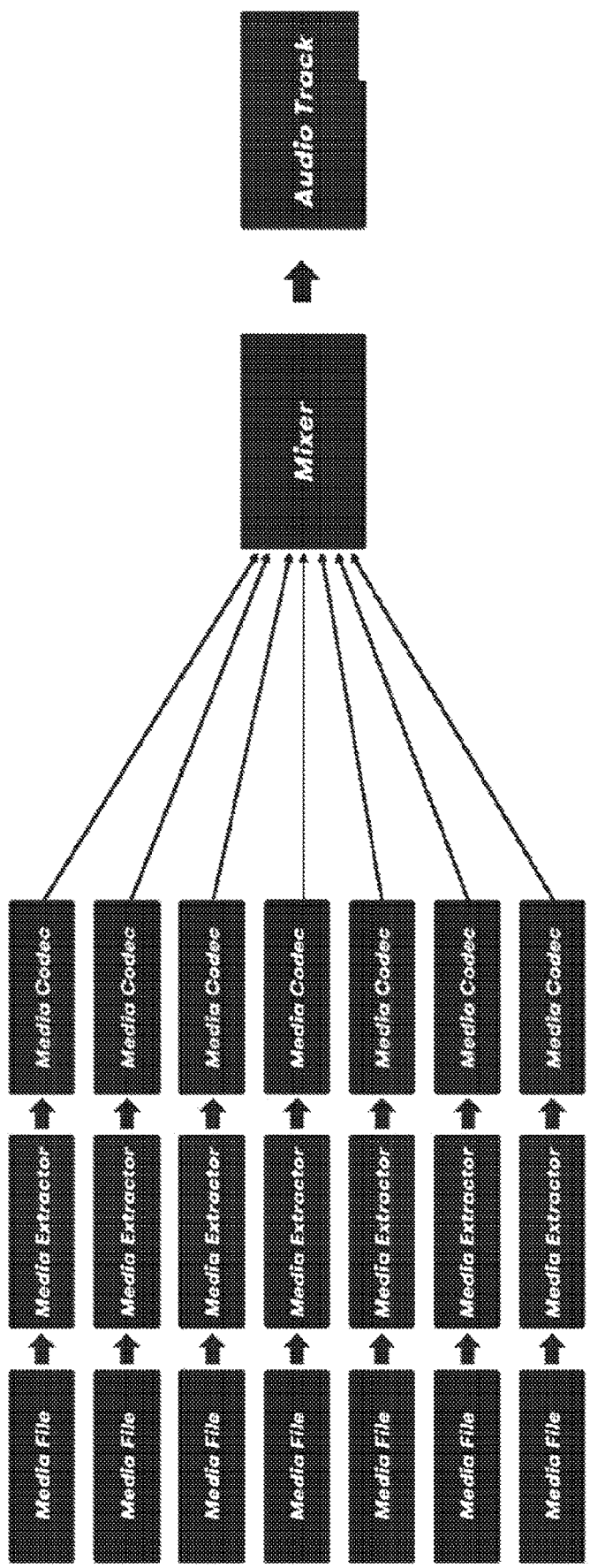
FIG. 8 depicts the mixer of the present invention in which a plurality of media files (audio in this example) are fed to a media extractor and a media codec for breakdown and, after being broken down, are fed to a mixer of the present invention to form a combined audio track.

FIG. 8 depicts the mixer of the present invention in which a plurality of media files (audio in this example) are fed to a media extractor and a media codec for breakdown and, after being broken down, are fed to a mixer of the present invention to form a combined audio track.

The controller of the present invention is usable as a controller for mixing. We see this virtual 2-dimensional audio mixing console being used in three different applications:

Can be used in digital multi track audio device in any digital device.

Can be used as a special display for a live audio mixer

Can be used as separate virtual add-on, connected to the virtual mixer in several digital sequencing programs.

This on-screen controller can be provided so that a plurality of touch buttons, such as one per instrument or instrument group, can be displayed and provide a visual indication, relative to one another, or each one's volume and balance.

Music in the OIID Format

OIID music fits a format ("OIID Format") in which multiple track are available and any number can be selected for synchronized concurrent playback. A piece of music, or a song published in OIID format could include all the above forms of music COMBINED TOGETHER FOR THE FIRST TIME as one complete unit, with every possible aspect of a musical composition included in one combined "folder" comprised of individual files, including but not limited to:

a recorded multi-track with each stem of a music file (each instrument or voice can be considered as a separate stem);

a music video;

an interactive application allowing the user to interact with one or more of the multi-tracks of the music;

the sheet music;

the chords;

the lyrics;

the commentary of that particular piece of music;

the overview/summary/biography of the composer/artist;

the story of how the song was created;

an extra "behind the scenes" video;

an instructional video synchronized with the audio file;

an additional audio file with the composer/conductor describing the music.

Several of these videos can appear concurrently, just like several audio stems can be played concurrently. The choice of what to play and display is user-selectable from a menu-driven interface.

In the context of the present invention each track is separately structured in a usable format. As a track is played (or otherwise examined by the processor of the present invention), the track is re-structured as needed to conform to OIID format needs, such as for purposes of mixing and synchronization. The content is decoded and re encoded as needed. This restricting applies to both audio and video stems.

Further, by decoding the file, the processor of the present invention can formulate additional stems, such as preparing visible sheet music and lyrics, where the lyric files could be stored to indicate where the lyric being sung at that moment is (such as by color difference).

The system of the present invention further includes sound and text recognition modules so that separate tracks or files can be prepared which relate to lyrics, chords, and other musical or sound attributes. Also, these various tracks are time synched so that if a listener selects two audio tracks and three video tracks for concurrent playback and then skips ahead, the system keeps all five tracks time synched during playback.

In addition to all of these elements combined in one single platform, OIID allows for an enhanced level of the musical experience by providing an unprecedented technology to permit users to create their own personal mix of the music with the ability to add vocals or instruments on top of the original song.

OIID is about redefining music to be more than just a performance, more than just a recorded sound, more than just notes on paper. It is all of these things together, added with the technical innovation of playing along and recording with the multi-track that makes OIID unique, new and bold.

In each OIID file, the user can obtain all of these elements.

An Example of the Recording Process that Results in Creating an OIID Folder

OIID also allows users to record their own tracks, either from scratch or in combination with existing tracks. OIID allows a user to add a track to an existing song. As an example, supposing that there is no violin track for a particular song, Using the OIID controller and decoding/encoding techniques, a violin player can add a track where they see the violin most fitting.

The process which goes into creating an OIID song necessitates a UNIQUE and UNPRECEDENTED multi-layered recording process which requires several steps. For example, to create an OIID song for Classical music, the following steps are taken.

Step 1: First, there needs to be a first audio recording of the whole ensemble/orchestra. Optionally, a separate parallel track of corresponding video may also be recorded.

Step 2: A separate recording of each instrumentalist or instrumental group, for example, a separate recording of only the violinists performing and recording, done while the violinists listen to the first recording of the whole ensemble.

Step 3: A third layer of recording of each instrumental group, for example, the viola group, performing and recording while they listen to the first recording of the ensemble.

Step 4: In the 'final mix', every layer produced in the two last steps.

This unique recording process results in complex, multi-layered tracks enabling an interactive and dynamic musical experience. In parallel, video of individual artists or of the finger movements of artists can be concurrently recorded. The consequence of this is multilayered audio and/or video, with embedded coding for synchronization, being available to users for customization. The ability to afford customization lends itself to numerous potential benefits, such as individualizing enjoyment of music, further customization, and as an education tool for helping an individual learn a part in an orchestra, including learning cadence and fingering.

Further, OIID includes a customizable delivery module. That is, a user can use an OIID interface to select audio and/or video tracks for playback, such as to focus on one musician in a group and to, for example, overlay sheet music. In the method of the present invention, a processor is used to interpret sheet music so as to synchronize appearance of the sheet music on a screen with playback. Similarly, chords can be identified automatically and highlighted visually. So, for example, if a user selects a guitar portion, the user can hear the guitar only, can hear the entire band with visual focus on the guitarist's fingering, or show the fingering with sheet music. An on-screen one finger controller is available to control panning and volume, for example.

In addition, OIID may have a decoding and recognition module so as to establish, for example, a track for lyrics or sheet music. Chords can be identified by the processor of the present invention. Similarly, the processor of the present invention can "listen" to tracks and prepare sheet music for visual playback. When sheet music is displayed on screen, such as in combination with audio playback, the sheet music can include highlights and/or scrolling to aid the listener in recognizing the music being played at that moment. Relatedly, a user playing back the music can control playback, such as by rewind or fast forward control. Such control can be incorporated in the GUI of the present invention.

OIID and Its Example Uses

1. Live Music

The above-mentioned description demonstrates OIID music use relative to recorded music/song on an OIID interactive platform, but OIID music can also be delivered as a streamed live concert. That is, because the system of the present invention can recognize sheet music and lyrics (audible or written), either or both can appear concurrently with live or streaming content. The appearance of both can be synchronized to the playback. The streamed OIID music may have the following content:

Streamed video file

Streamed multi track sound with the possibility of live remixing of the sound

Streamed sheet music

Streamed chords

Streamed lyrics

Streamed animations of "how to play"

An audio recording system allowing the user to play/sing-along along and record synchronized with the streamed music A video recording system allowing the user to video record your personal performance synchronized with the streamed music-/video-production 2. Theater OIID can also be used for theatre productions. As an example, a pre-produced play could be presented with several video tracks and each character presented as separate audio tracks that can be mixed, muted or solo. A new performer for an existing on-going production can match a presentation so as to learn a part, or an audience member can focus on one action and song of one actor, focusing on video, the audio, or a combination. This means that people can sit in their homes and rehearse roles in a play. This should also allow for two users, located in different countries, choosing different roles in the same play, to act together via the OIID-platform. They will all be able to record both video and audio. In this case they can create a complete play together, including their performance, both video and audio recorded. All synchronized.

In a further example, overlay audio can be prepared, such as by an instructor so as to facilitate distance learning.

3. Sports, Politics, Diplomacy, and so Much More

OIID can be used for real time presentation as well. OIID technology can also be used for many other purposes, for example, for streaming a soccer game—the commentary of the game could be muted, or switched to a different commentator, or to a different language. The same is true for political conventions or a diplomatic conference.

How to Prepare and Build an OIID Song

All media content is presumed to be provided by the official artist/label/management for inclusion in the OIID folder.

1. Media preparation
   a. in the context of the present invention, the stems in the multitrack are leveled and synced to any musical visualization.
   b. Segments and synced events are added to the folder.
   c. The media is encrypted and saved in the appropriate format/codec for exact playback capabilities.
   d. Streamed media is provided in the format/quality the client can handle.
2. Any Background story: This is potentially exclusive content that comes with each OIID music. Extra material about the song and artist is similarly prepared. Its appearance may be synched to the music manually.
3. Metadata preparation—Synced events such as chords, lyrics, narration are added using dedicated software. The system of the present invention synchronizes metadata.
4. Add track metadata, such as track types and amplitude forms.
5. Beta processing. The OIID file containing all the separate elements that build up the OIID, is prepared for processing.
6. Approval from the rights holders. Distributed through separate versions for approval or adjustments.
7. Any Final processing
8. Updates—Extra material can be added at any time.

How the OIID Client Apps Handle OIID Files

At the core of OIID is the OIID file format. It describes the media involved and the surrounding metadata. The description below, together with the series of figures, depicts flow through of content of video, audio, and text files. A custom interface allows a user to "build up" content of an OIID folder with different video, audio, and text files, potentially all synchronized with each other. In general, the interface is similar, whether for initial build-up or subsequent re-build up.

FIG. 3 depicts an example of selectable tracks in the graphical user interface of the present invention in which a user can select instrumentals, vocals, video, or other (such as metadata associated with playback or other metadata). Data for a song could include composition data, musical data such as music stems and chords, and video and text data.

Types of Metadata which could be Included are:
Example Composition Data
Rights holder(s)
Label
SKU
Data needed for the reporting system, when reporting to right holders
Graphics
Musical Structure
Stems
Segments (a segment is a specific part of the song, e.g., verse and chorus, guitar solo, etc.)
Musical Events
Chords
Lyrics
Textual Events
Narration
Layers OIID stems are arranged in layers, with some layers audible/visual and other layers inaudible or invisible. The layers include:

Data Layer

The data layer holds the media in its raw form. The main elements in an OIID can be seen in FIG. 3.

Sound Layer

Figure 4:
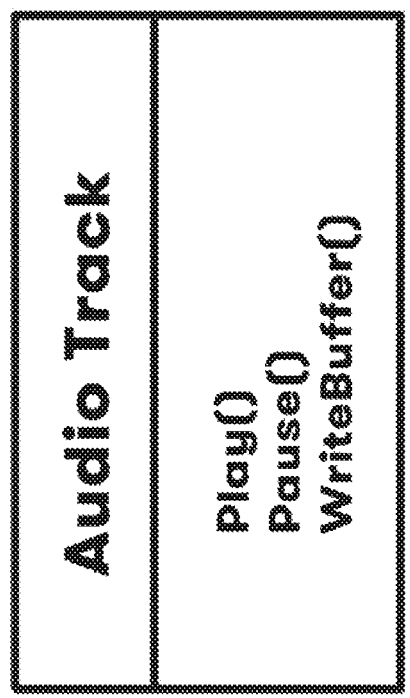
FIG. 4 depicts an example of how the present invention prepares sound by buffering.
Figure 4:
Figure 4:
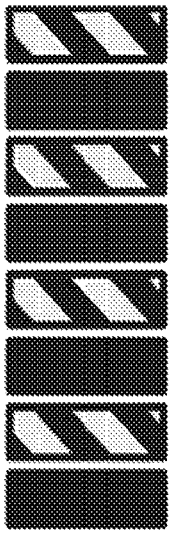

The sound layer consists of several methods of controlling the sound objects provided by the Data Layer. Blobs of sound media are fed into the buffer (see FIG. 4). The buffer needs to feed decoded frames forward in the direction of the device in order to keep up with the playback rate. In detail, criteria for the codec include:

The criteria are that the device including one or more codecs can decode the audio using its built-in codecs (see FIG. 5). Small chunks of the media files are fed to the decoder.

Figure 6:
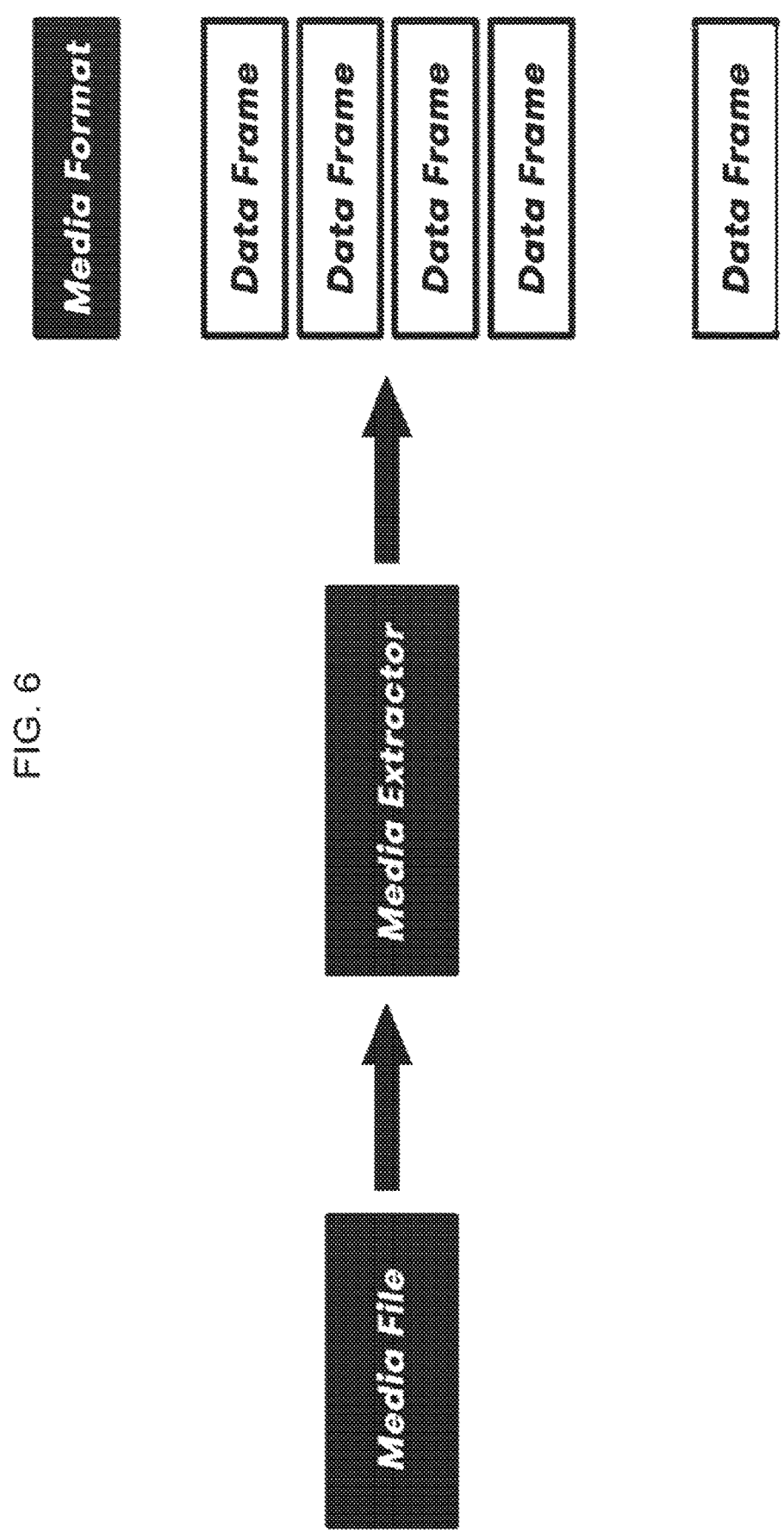
FIG. 6 depicts coding and decoding of the present invention.

For example, the codec permits mp3 encoding and decoding, wav encoding and decoding, ogg encoding and decoding, andalac encoding and decoding (see FIG. 6). This is critical to the user experience.

Figure 7:
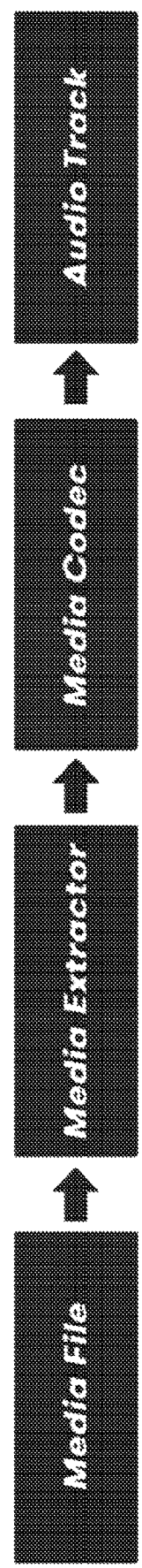
FIG. 7 depicts the signal processing chain of the present invention.

The processing signal chain is multiplied for each of the tracks within the OIID (see FIG. 7).

After passing the extractor thread, the musical outputs are mixed into one single output (see FIG. 8).

Figure 9:
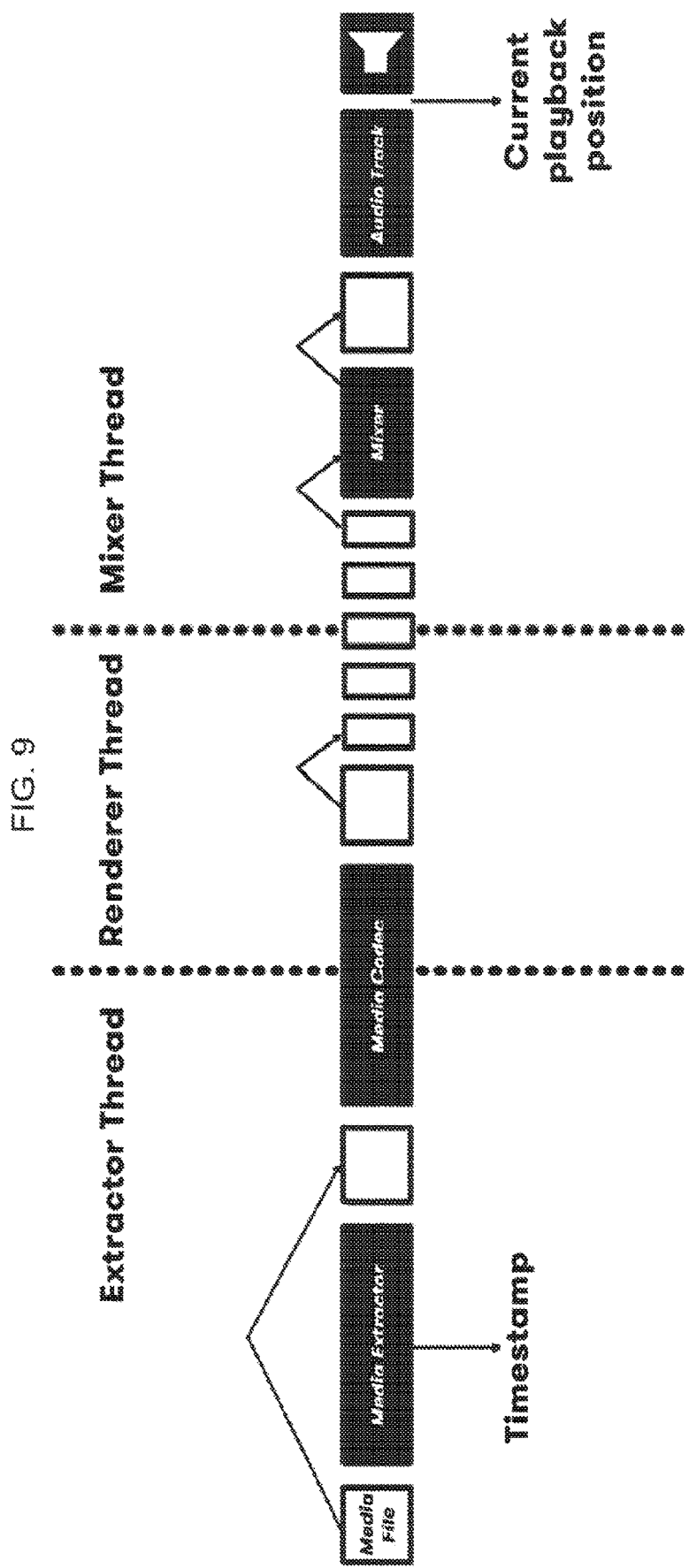
FIG. 9 depicts the interaction layer of the present invention.

Any interaction that is performed in the interaction layer is set to manipulate the sound mix, happens in the mixer thread (see FIG. 9).

Figure 10:
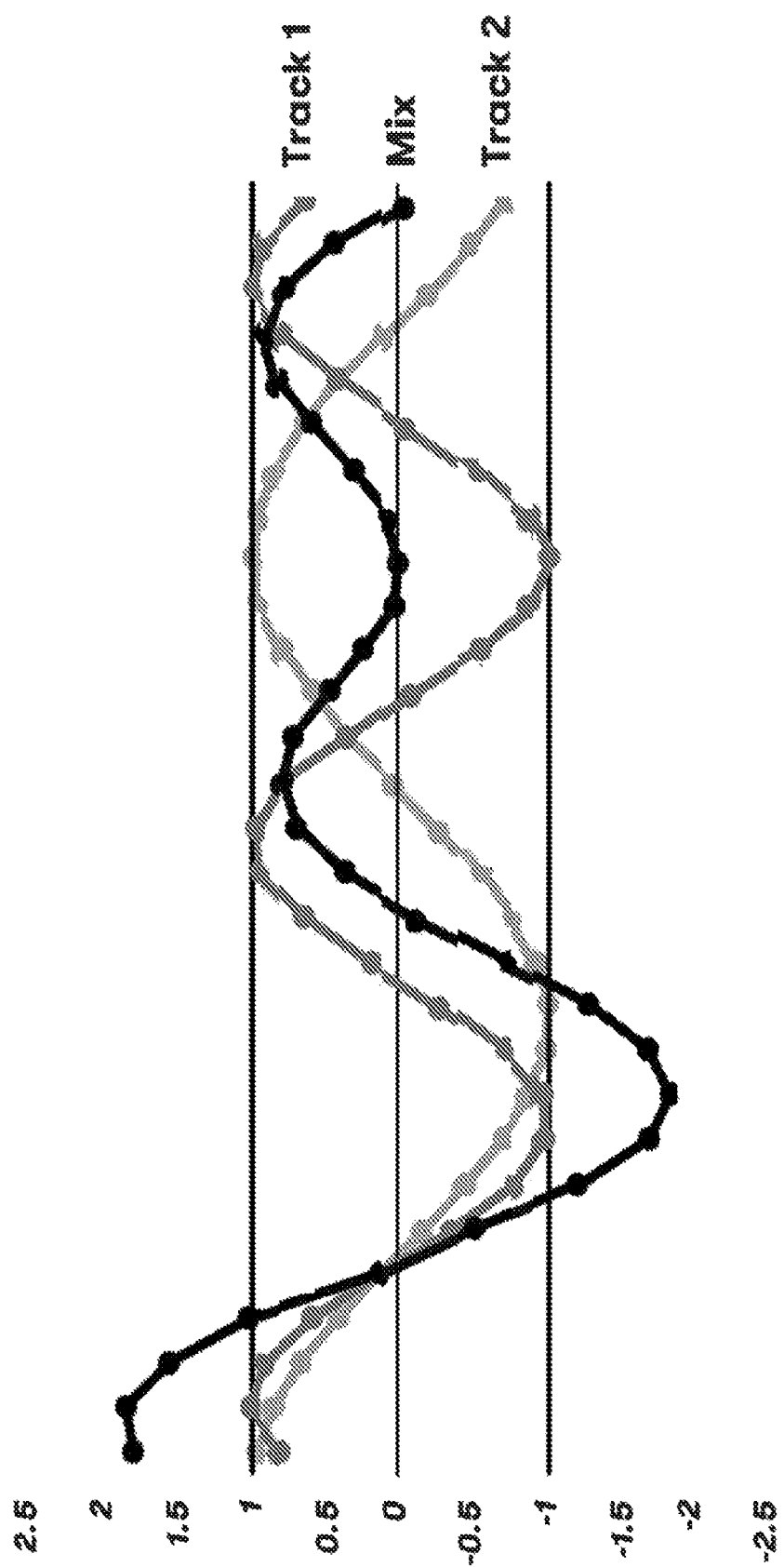
FIGS. 10-11 depict the audio mixing, including avoidance of distortion, in the context of the present invention.
Figure 11:
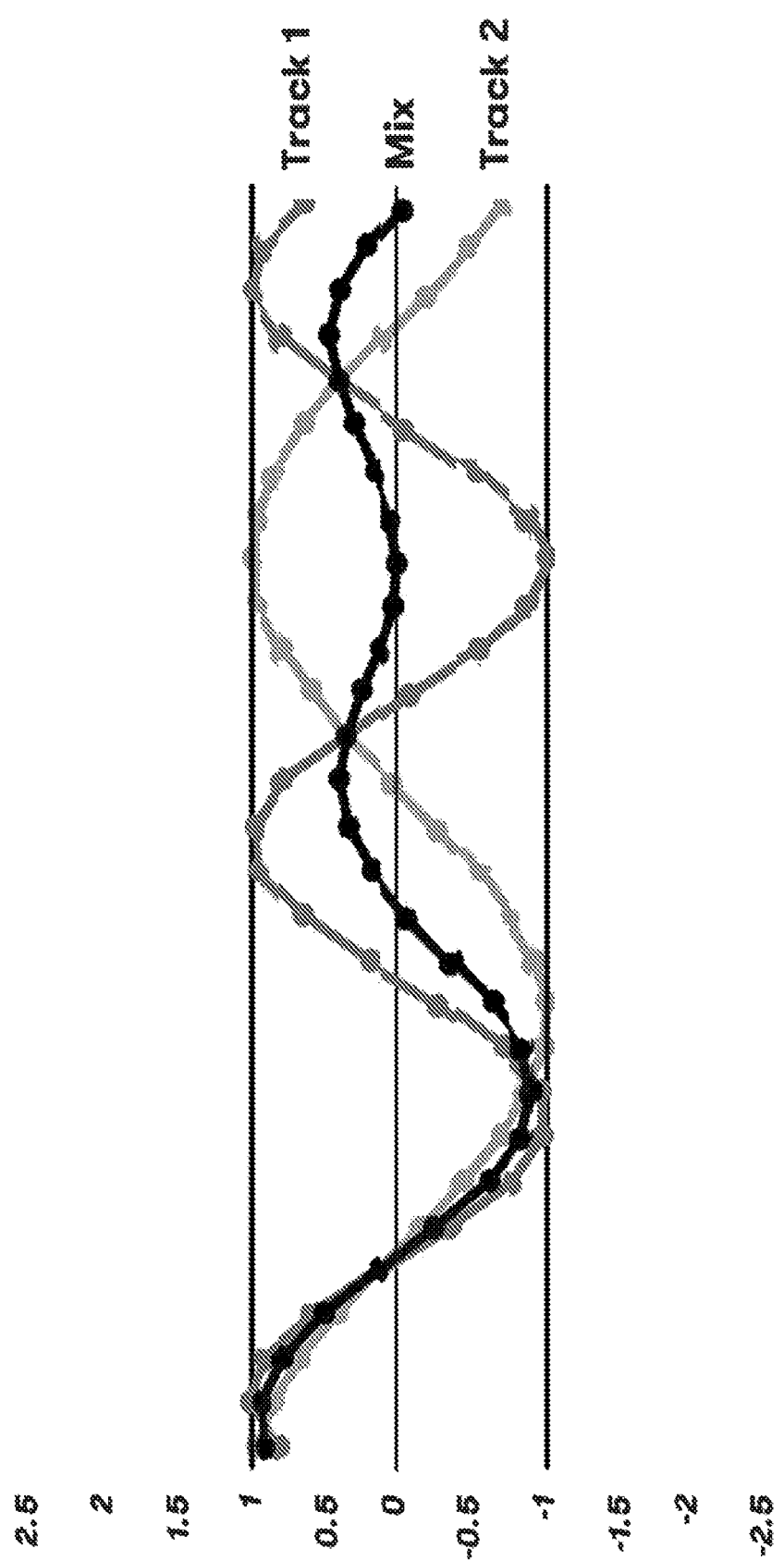

To avoid audio peak distortion, the audio is mixed using an average of the waves being played back (see FIGS. 10-11).

Figure 12:
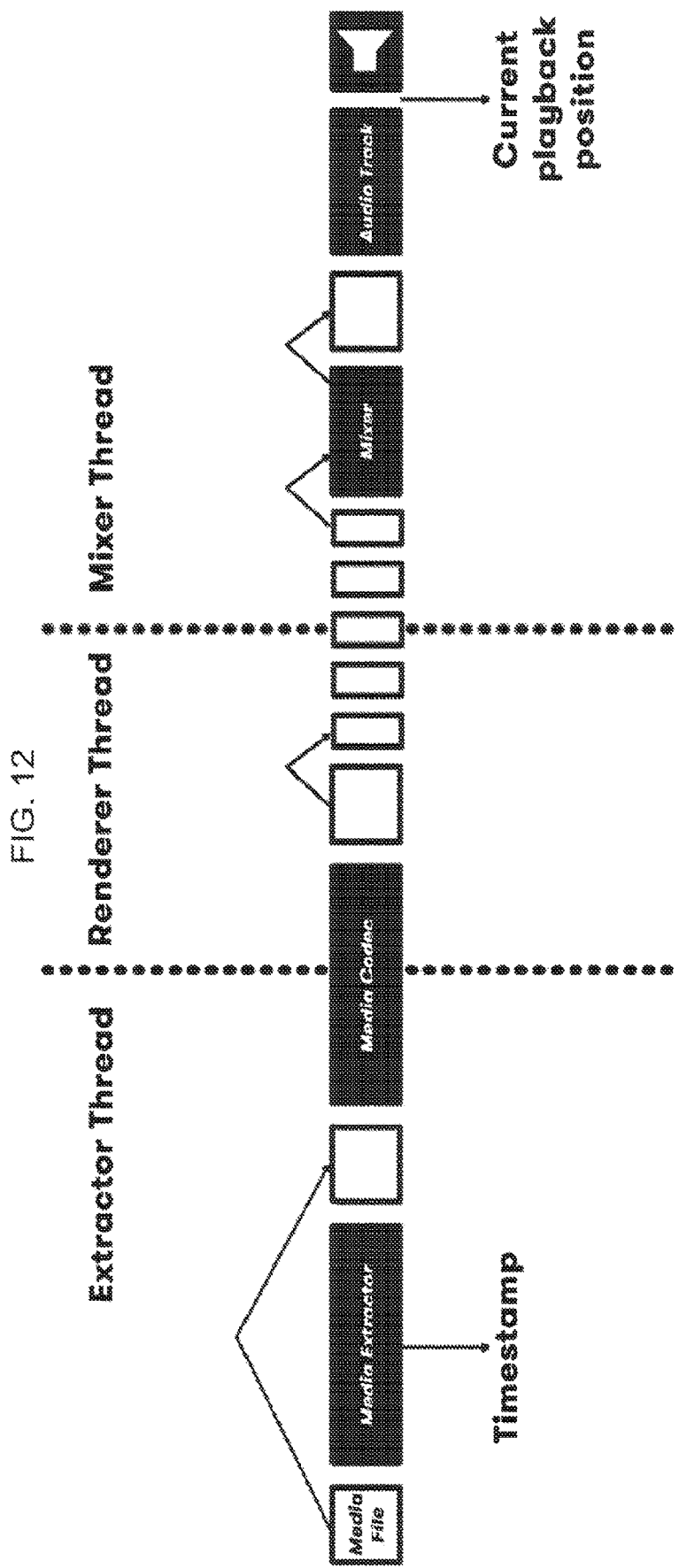
FIG. 12 depicts an example of synchronization of a plurality of channels in the context of the present invention.

And sent to the client for playback at the exact point of the time stamp's corresponding playback position (see FIG. 12):

Musical Visualization Layer(s)

The present system includes the ability to decode music and turn it into visualization. The visualization could be in the form of sheet music, lyrics, or some combination. See FIGS. 13a-13j for examples of visualization.

Video can be music video or streamed live video footage. See FIG. 13a.

Video can include control keys overlaying streamed or recorded content. See FIG. 13*b*.

Music Notation/Score. See FIG. 13*c*.

Narration/Pop Up. See FIG. 13*d*.

Sing-along. See FIG. 13*e*.

Play-along. See FIG. 13*e*.

Magazine/Exclusive rich media content. See FIG. 13*f*.

Figure 13A:
FIGS. 13a-13k depict sample screen shots from a computer, tablet, or smart phone screen, depicting different examples of the types of displays available in the context of the present invention.
Figure 13B:
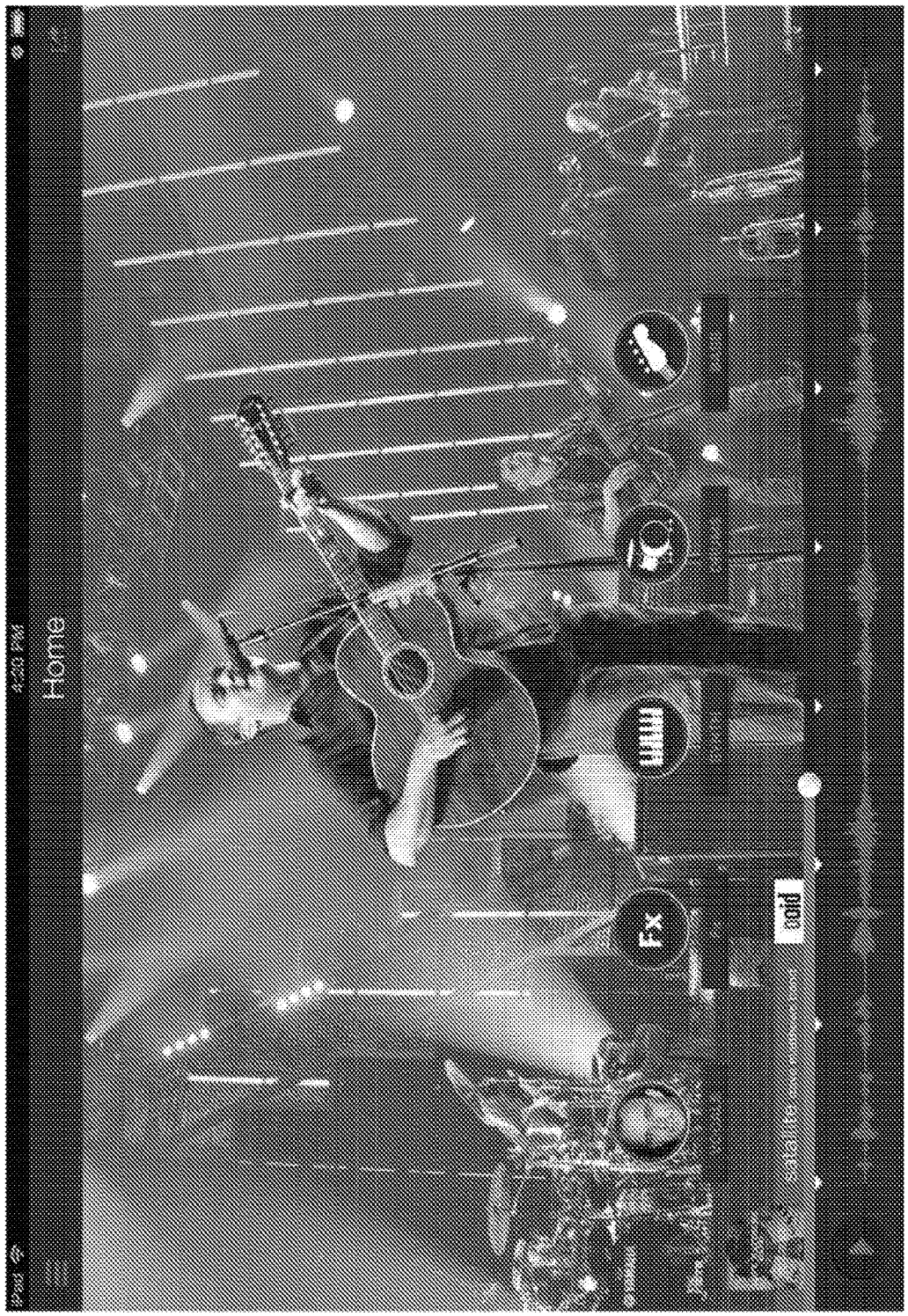
Figure 13C:
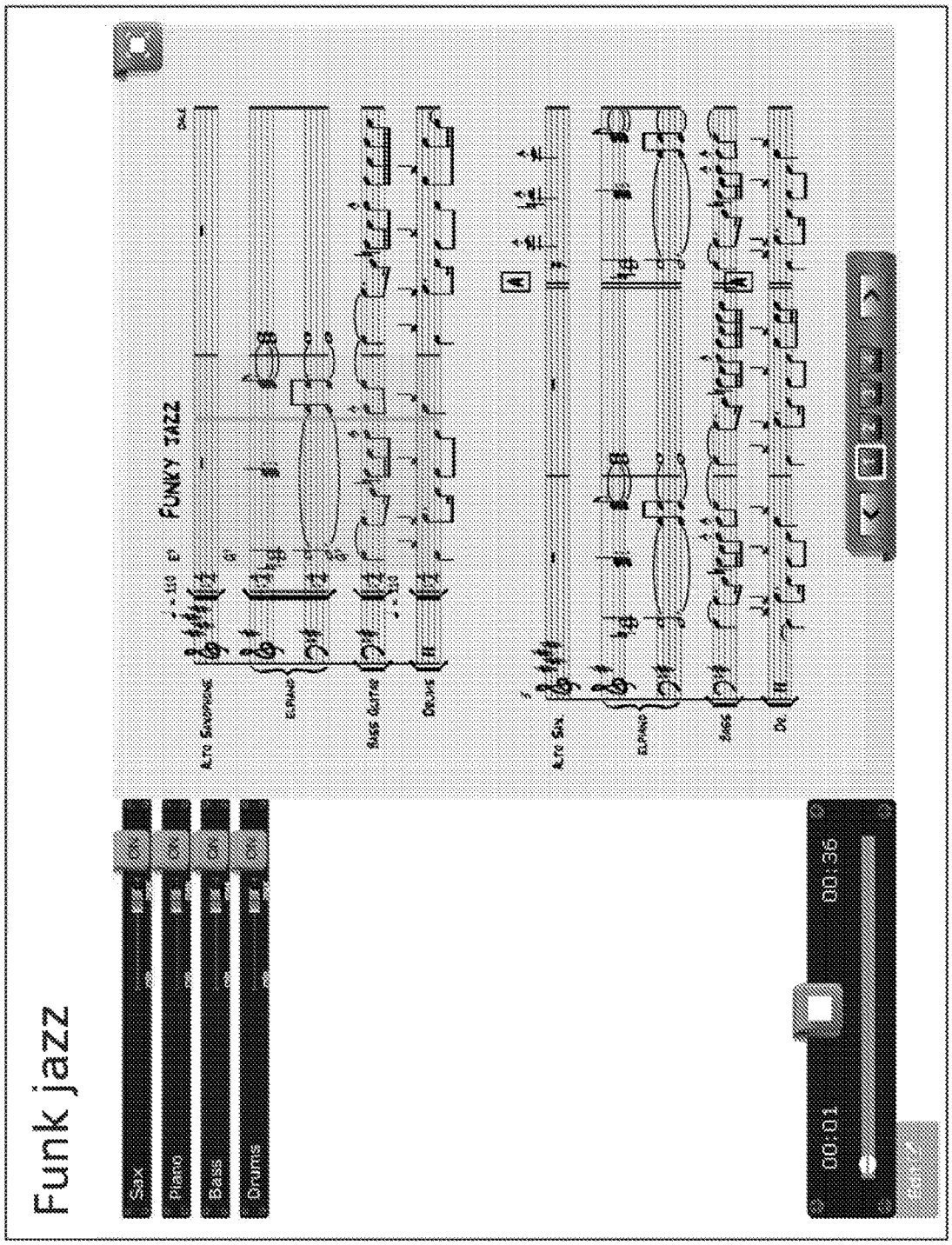
Figure 13D:
Figure 13E:
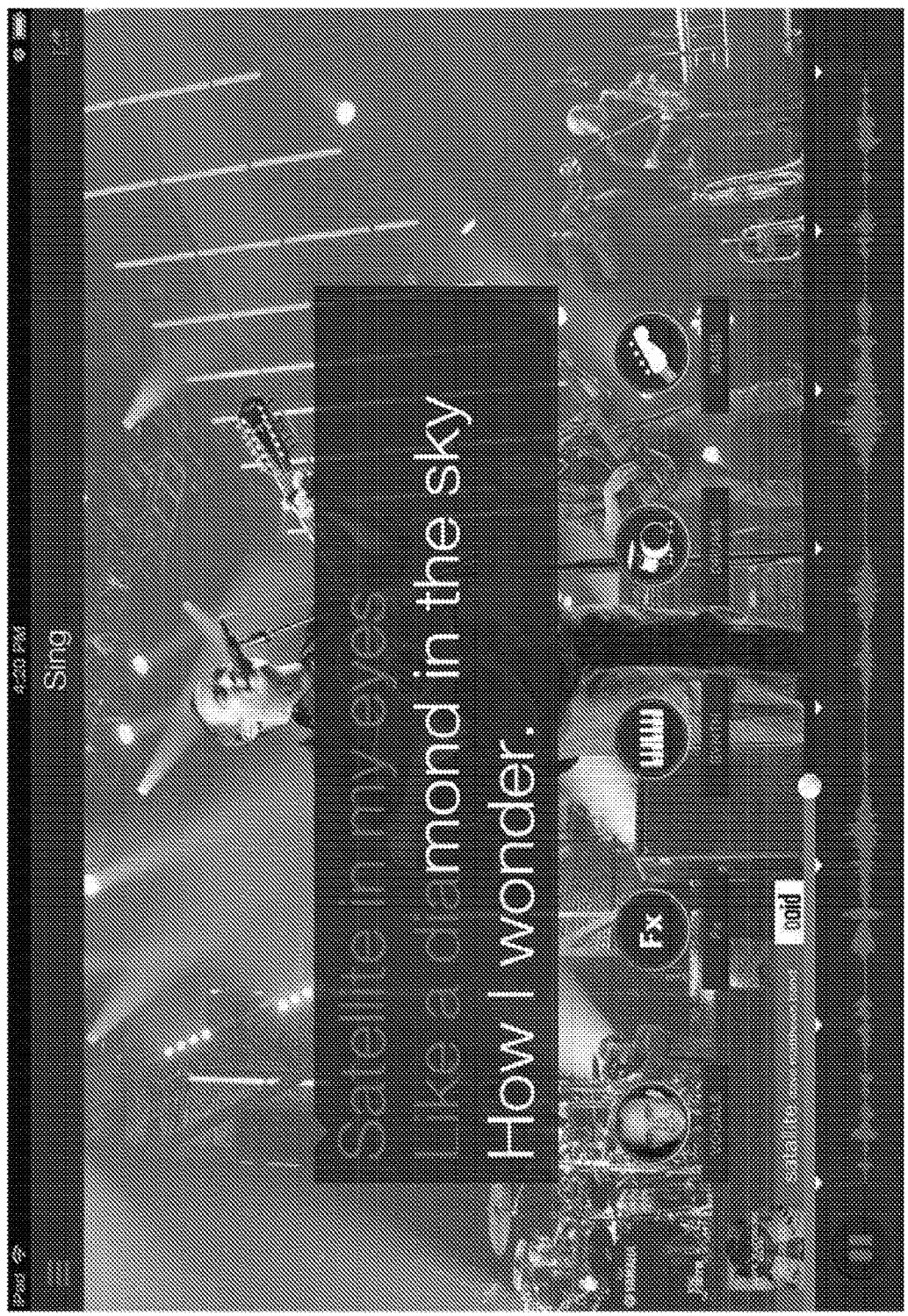
Figure 13F:
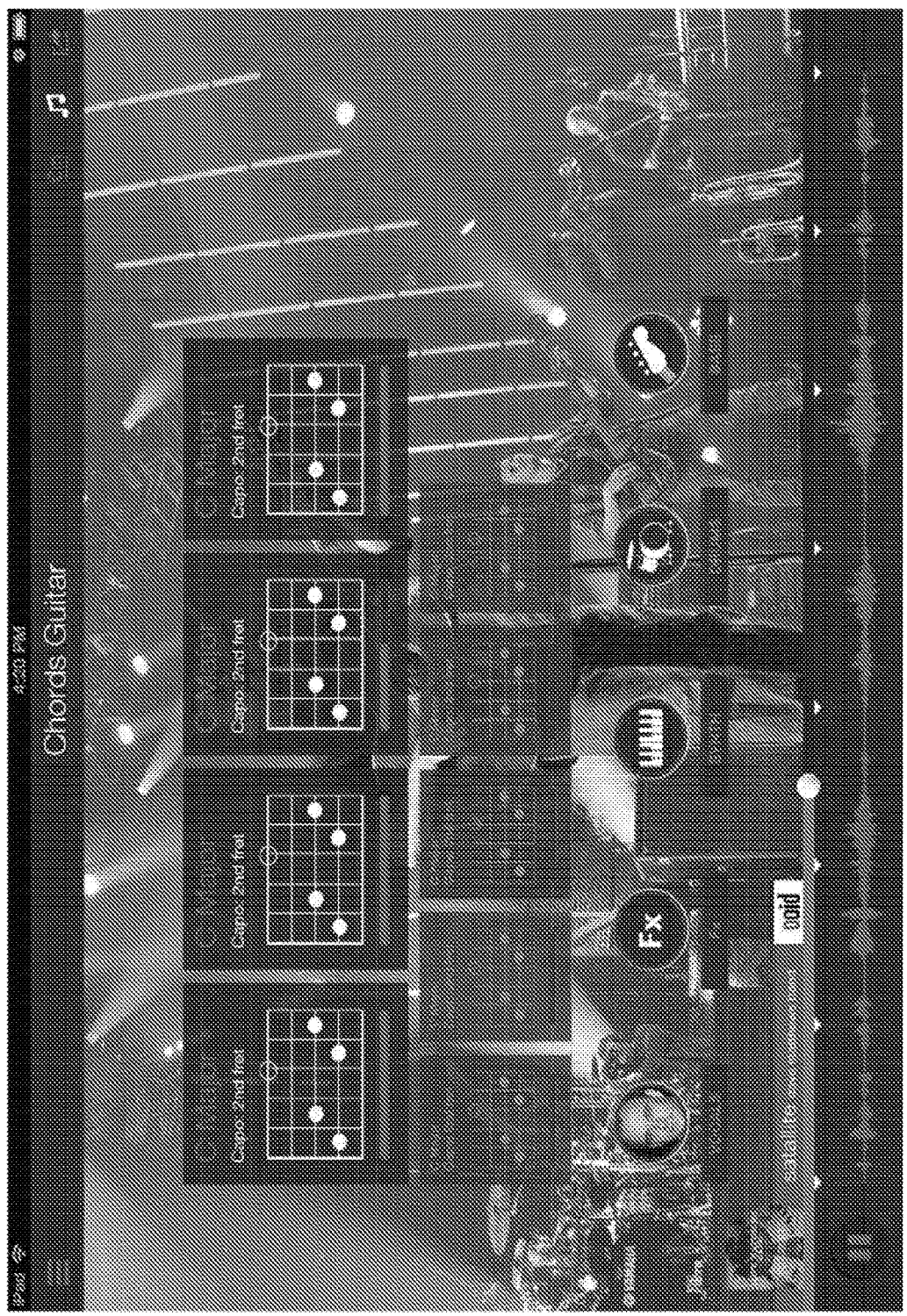
Figure 13G:
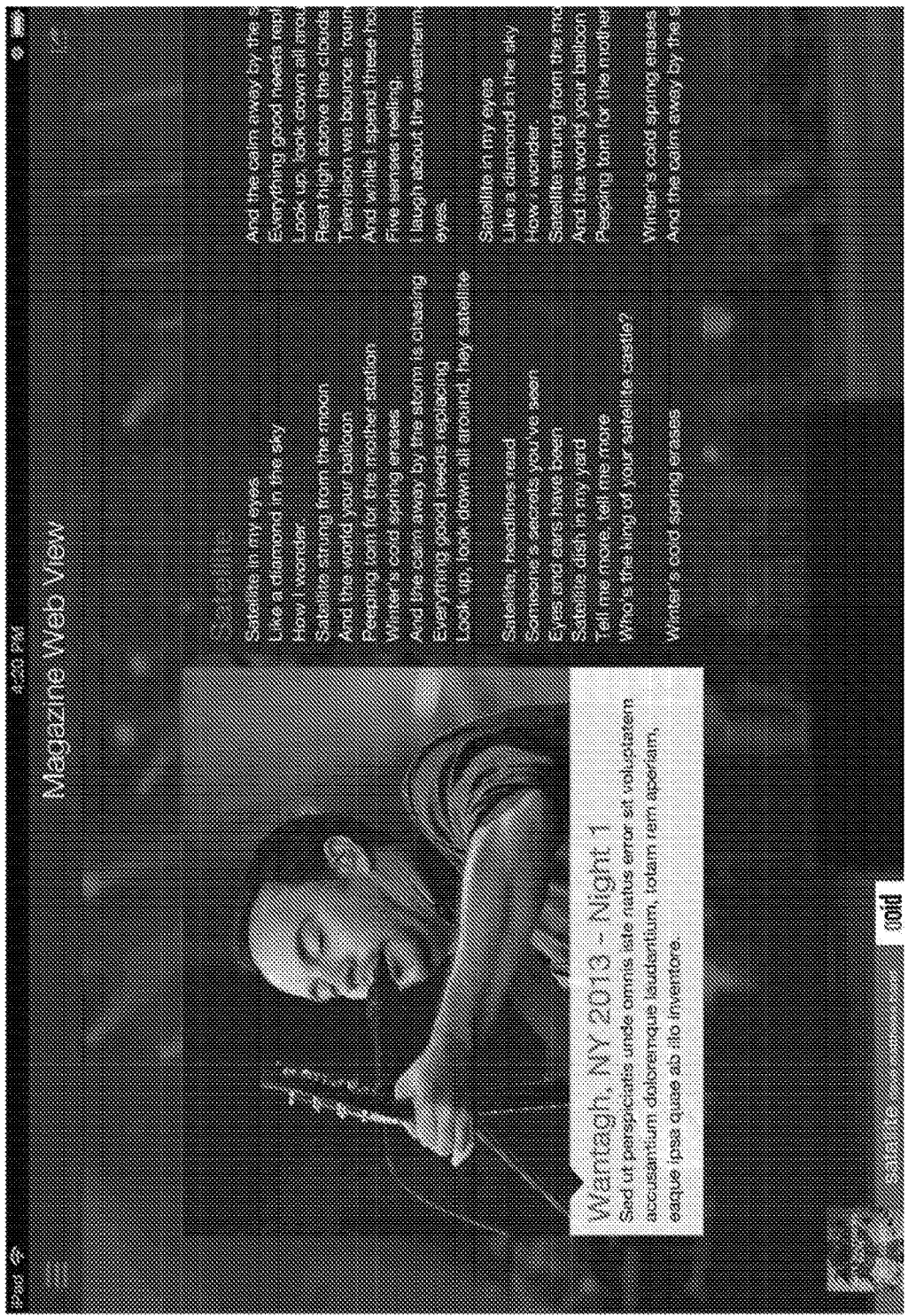
Figure 13H:
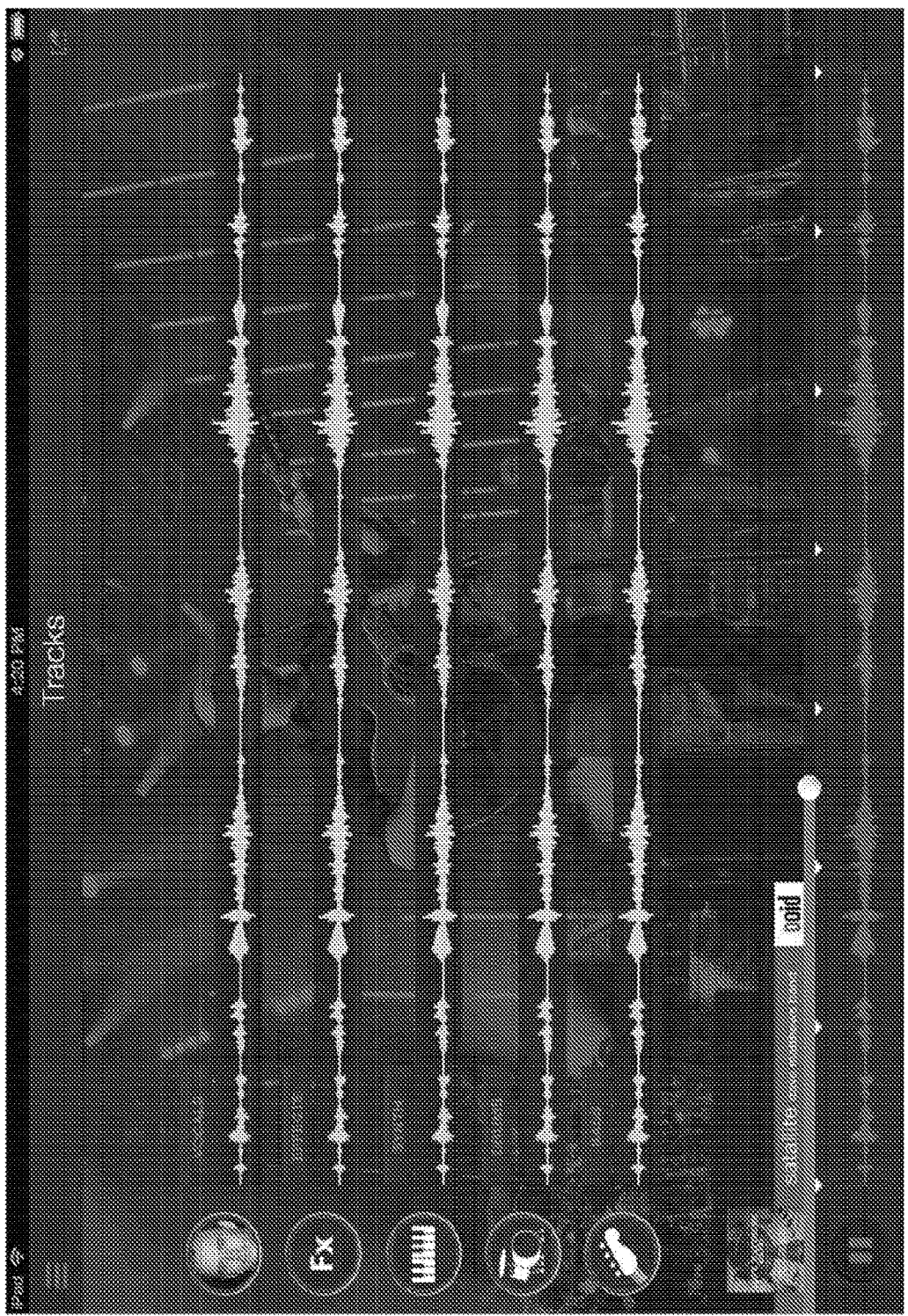

Other visualizations See FIG. 13*g*.

Interaction Layer(s)

Playback controls; Control the playback to any segment or any point in the song.

Sound mixing controls. See FIG. 13*h*.

Figure 13I:
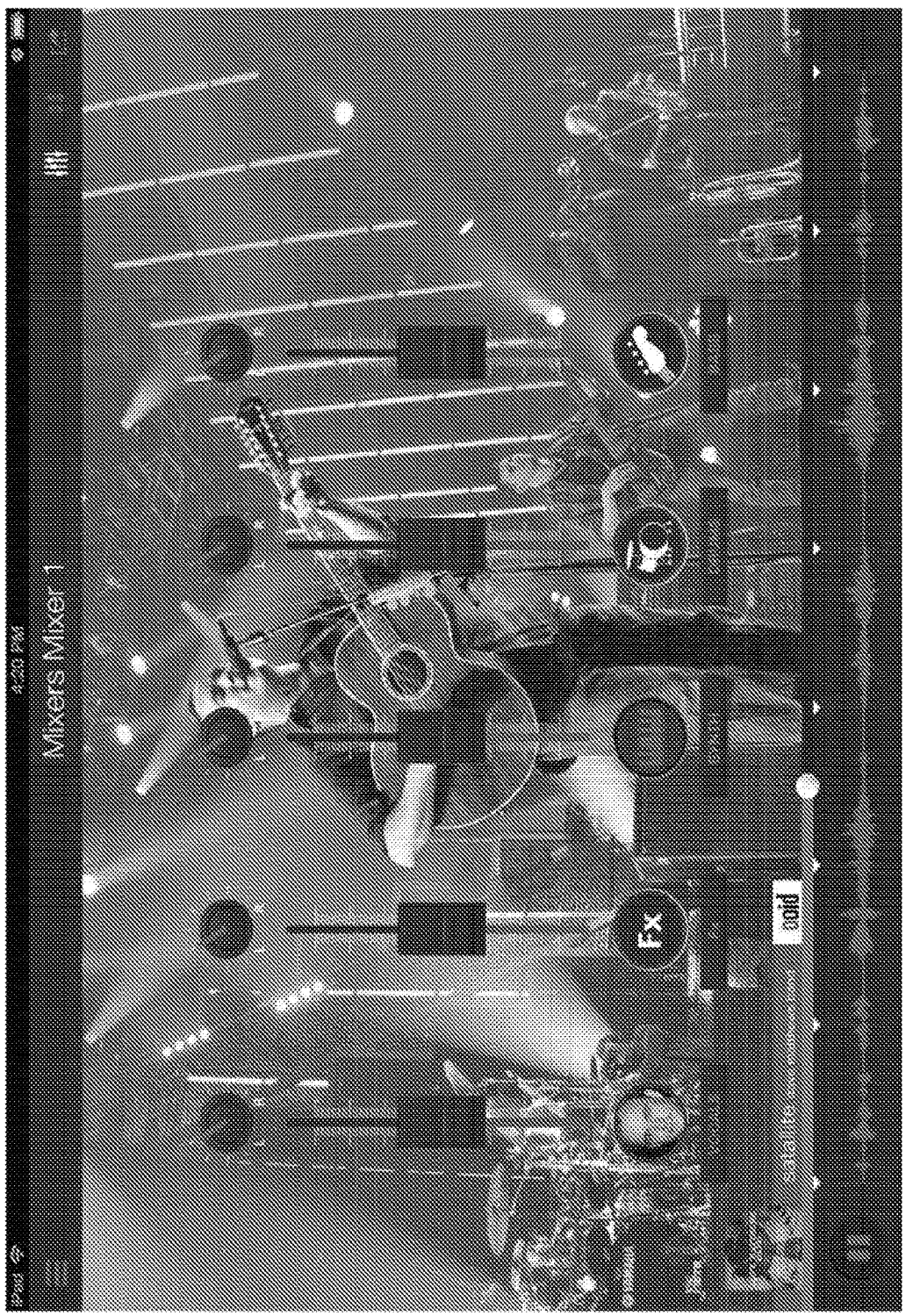

Control the mix in real-time at the touch of a finger or using gestures/gyroscopic or geo location (see FIG. 13*i*). This lets the user mix in real-time both by tilting the device and moving the instruments within the screen. (3D mixing).

Figure 13J:
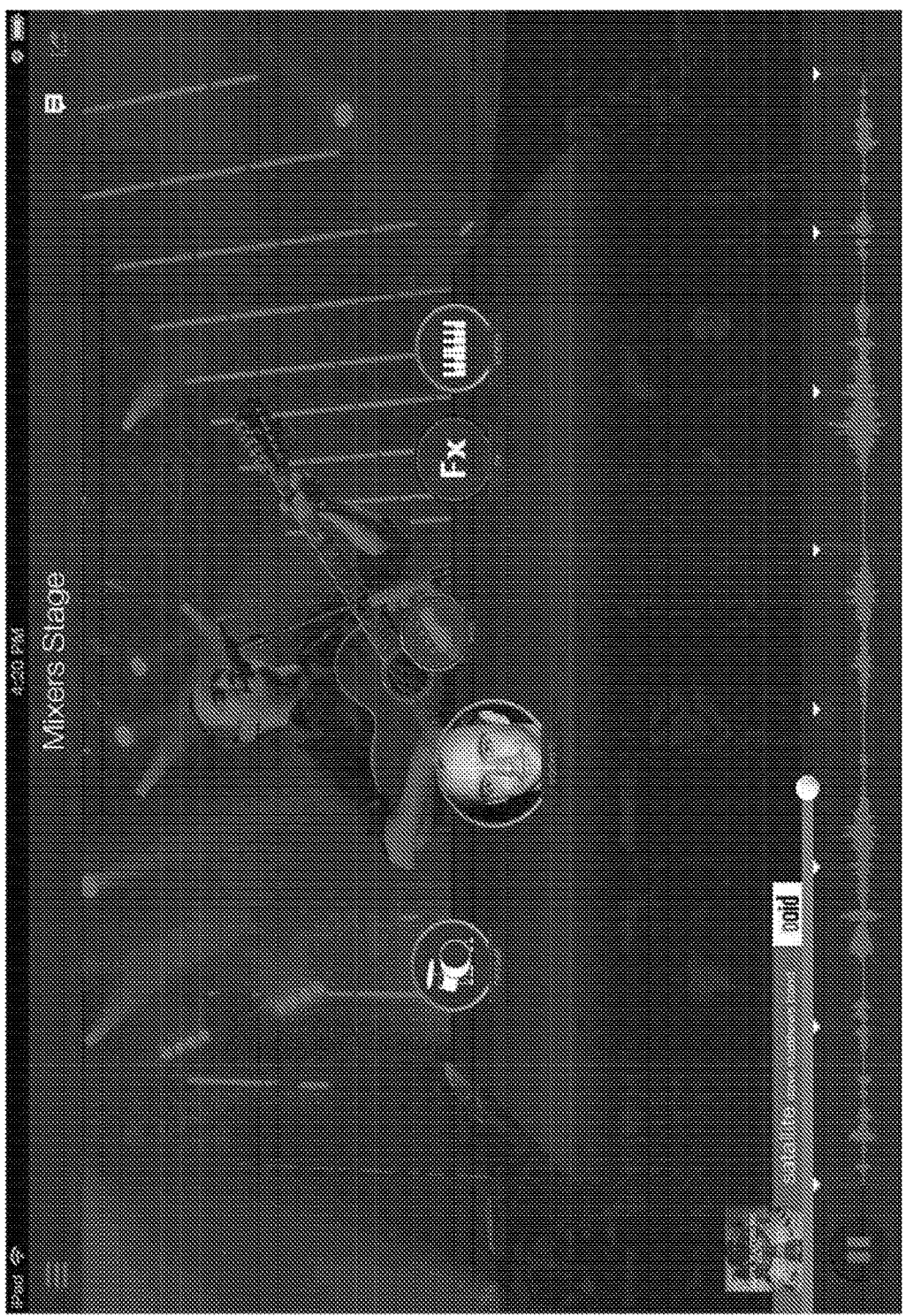

The mixer interface shown in FIG. 13*j* can use one movement to control the sound in the 2d or 3d space. This can be multiplied for multiple gestures/input devices (such as fingers).

The visual positions of the sound object can also be fixed to a point, i.e., in a room, and the user interactivity can enhance this sound object or completely isolate it based on the positioning of the focus point, using an overlaid sound controller.

Figure 13K:
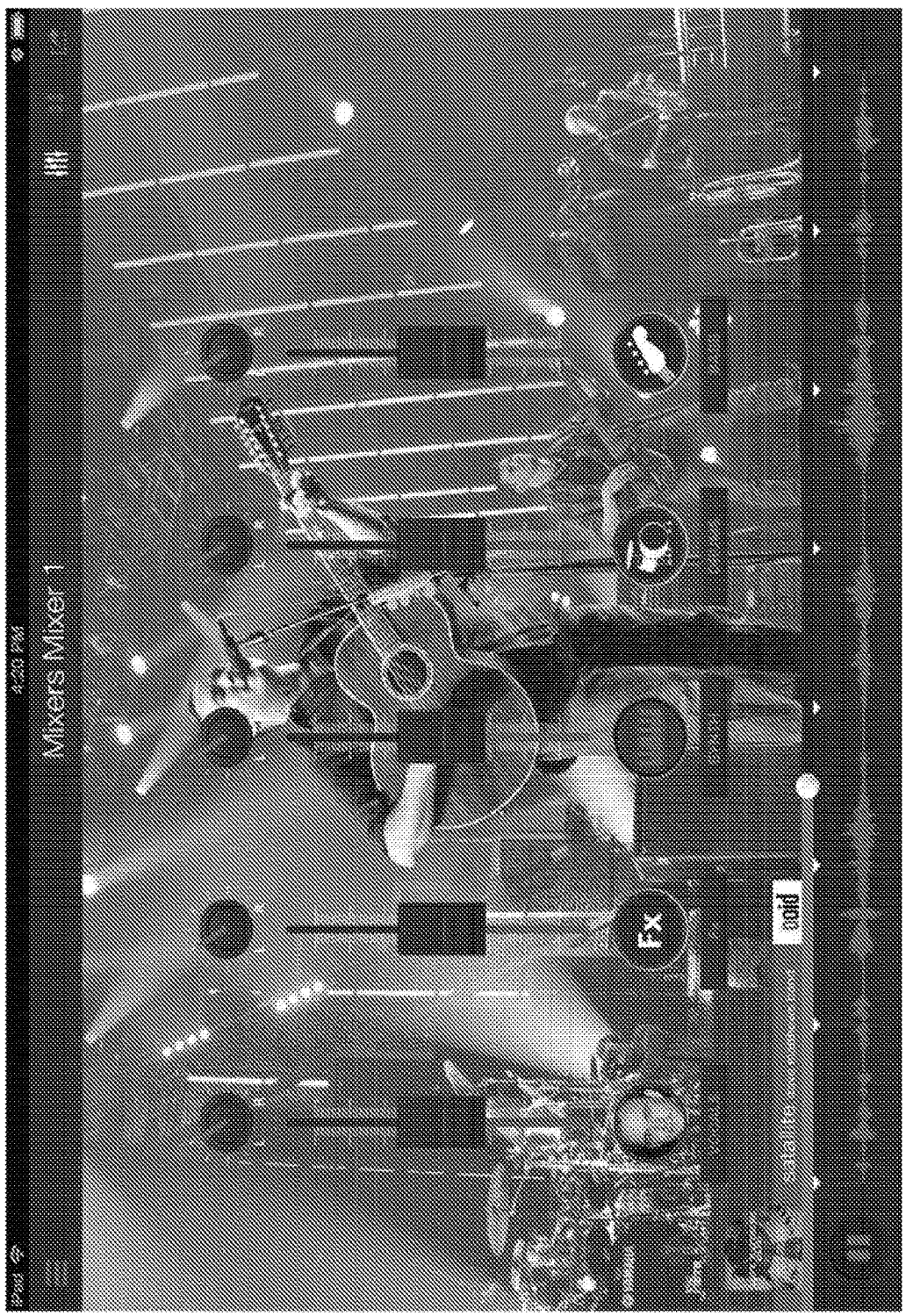

It is possible to re-arranging the order of the song (FIG. 13*k*).

Figure 14:
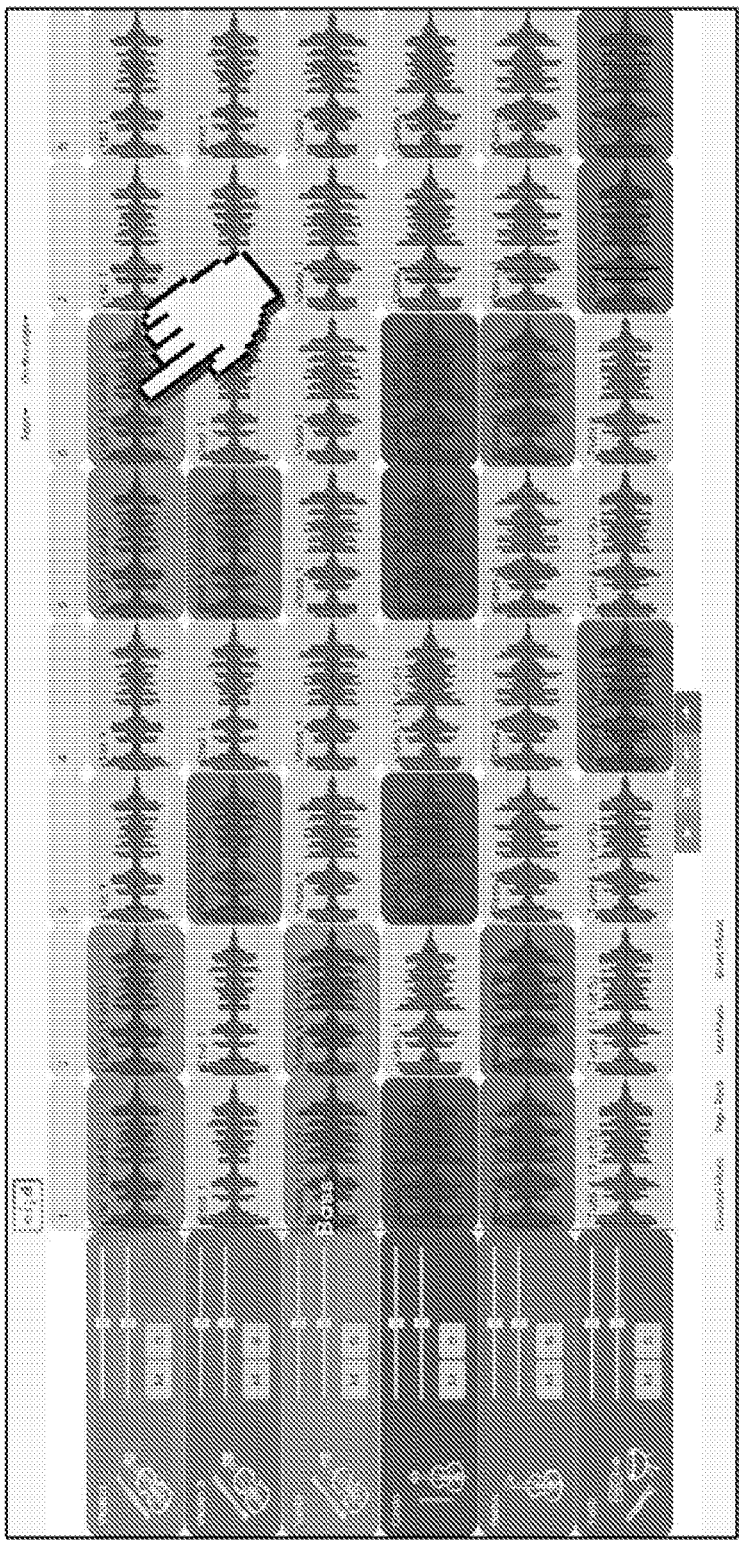
FIG. 14 depicts a representation of the metadata, instrument by instrument, in the context of the present invention.

The metadata (see FIG. 14) in the OIID format provides sample accurate segments on the loop level that can be utilized by the client application. In this way, the OIID can be used to create personal versions of the OIIDs.

Rights management can be embedded in the metadata and recording, export, sharing and publishing functionality is provided on the material where this is permitted.

The invention claimed is:

1. A method to create a custom audio visual musical composition using a processor-driven graphical user interface (GUI) with a display, said processor in communication with at least one data store and a server, comprising the steps of:
    receiving a plurality of media files from a first data store controlled by a server, each said media file in said plurality of media files time synchronized with the other of said plurality of media files and at least one of said plurality of media files being an audio file;
    receiving on said GUI display from said server a graphical representation of each said media file of said plurality of media files for user selection and one-finger movement, each said graphical representation one-for-one corresponding to one of said media files, each said graphical representation appearing in a different location on said display and each one-finger movable by a user to elsewhere and anywhere on said display, each said graphical representation comprising appearing so as to relate to content of its corresponding media file, each said graphical representation user selectable and movable for concurrently adjusting a plurality of musical attributes of the corresponding media file with one-finger touch, the magnitude of said movement corresponding to the moved distance in a virtual grid where the horizontal movement reflects adjustment of at least a first audio musical attribute and the vertical movement reflects adjustment of at least a second audio musical attribute associated with said media file during playback, both said at least a first and at least a second audio musical attributes adjusted concurrently with a single one-finger movement, said one finger touch adjusting at least two audio musical attributes including at least panning and volume, said adjustments captured in metadata associated with the respective media file;
    for each selection adjusted by a user by moving a graphical representation, delivering the media file associated with said graphical representation and associated metadata to a second data store for time-synchronized playback with the other of said media files;
    if at least one selected graphical representation is of a file including video, affording the user to further select by touch the location of display of content of said video on said GUI display;
    upon final selections by said user, said processor mixing at least said selected files with associated metadata for time-synchronous playback in said GUI; and
    storing said playback complete with associated control information stored as metadata indicating selected control of the plurality of selected media files in said second data store.

2. The method of claim 1, wherein further delivering to said GUI a controller access for forming a live recording in time synchronization with at least one media file in said plurality of media files.

3. The method of claim 2, wherein said live recording and said selected media files are arranged in said second data store to allow for common playback.

4. The method of claim 2, wherein where said live recording is audio.

5. The method of claim 2, wherein where said live recording includes video.

6. The method of claim 1, wherein upon selection of at least one said media file for playback, a visual representation of sheet music reflecting said selection is displayed on said GUI and stored as a further file associated with said plurality of media files in said second data store.

7. A system for formulating, storing, and playing a customized music experience comprising:
    a first data store for storing media files;
    a server;
    a mixer;
    a synchronizer;
    a second data store for storing at least adjusted media files; and
    a processor-driven computing device with a graphical user interface (GUI) with a display, a microphone, and a playback device;
    wherein said server is configured to deliver to said GUI a plurality of media files stored in said first data store, and deliver corresponding graphical icons to said GUI, each delivered said graphical icon in a one-for-one relationship with a media file in said plurality of media files,
    each said media file in said plurality of media files time synchronized with the other of said plurality of media files and at least one of said plurality of media files being an audio file;
    each said graphical icon delivered to a different location on said GUI's display, each icon being one-finger movable to elsewhere and anywhere on said display, each said graphical icon appearing so as to relate to content of its corresponding media file;
    each said graphical icon user-selectable for movement on said display using one finger, said movement reflecting change in one or more audio musical attributes of the associated media file, the magnitude of said change corresponding to the moved distance in a virtual grid where the horizontal movement reflects adjustment of at least a first audio musical attribute and the vertical movement reflects adjustment of at least a second audio musical attribute;

each said graphical icon user selectable for concurrently adjusting a plurality of musical attributes of the corresponding media file with one-finger touch associated with said media file during playback, both said at least a first and said at least a second audio musical attributes adjusted concurrently with a single one-finger movement;

upon final selections said mixer mixing, said synchronizer synchronizing, said server or said processor storing said adjusted media files in said second data store together with associated metadata, and said server or said processor combining said media files as adjusted configured for playback as a combined file in time synchrony and according to adjustment control arranged by said user on said GUI; and recording said combined file as a collection and storing said combined file on said second data store for later playback complete with metadata indicating selected adjustments.

8. The system of claim 7, wherein further including a controller deliverable to said GUI for live recording in time synchronization with at least one media file in said plurality of media files.

9. The system of claim 8, wherein said live recording and said selected media files are arranged in said second data store to allow for common playback.

10. The system of claim 8, wherein where said live recording is audio.

11. The system of claim 8, wherein where said live recording includes video.

12. The system of claim 7, wherein at least one said media file available for playback includes a visual representation of sheet music, is displayed on said GUI, and is stored as a further file associated with said adjusted media files in said second data store.

13. The method of claim 1, wherein said first and said second data stores are co-located.

14. The system of claim 7, wherein said first and said second data stores are co-located.

* * * * *